United States Patent
Lepper

(10) Patent No.: US 10,830,270 B2
(45) Date of Patent: Nov. 10, 2020

(54) FASTENING CLIP ASSEMBLIES

(71) Applicant: ILLINOIS TOOL WORKS INC., Glenview, IL (US)

(72) Inventor: Mark O. Lepper, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/447,348

(22) Filed: Jun. 20, 2019

(65) Prior Publication Data

US 2019/0390698 A1   Dec. 26, 2019

Related U.S. Application Data

(60) Provisional application No. 62/688,666, filed on Jun. 22, 2018, provisional application No. 62/688,667, filed on Jun. 22, 2018.

(51) Int. Cl.
*F16B 21/08* (2006.01)
*F16B 5/06* (2006.01)

(52) U.S. Cl.
CPC ........... *F16B 21/086* (2013.01); *F16B 5/065* (2013.01)

(58) Field of Classification Search
CPC ...... F16B 19/004; F16B 21/08; F16B 21/086; F16B 5/065
See application file for complete search history.

(56) References Cited

U.S. PATENT DOCUMENTS

| | | | |
|---|---|---|---|
| 3,093,874 A | 6/1963 | Rapata | |
| 3,476,008 A | 11/1969 | Pearson et al. | |
| 3,745,612 A | 7/1973 | Seckerson | |
| 4,318,208 A | 3/1982 | Borja et al. | |
| D380,667 S | 7/1997 | Kanamori et al. | |
| 5,897,278 A | 4/1999 | Frattarola | |
| 6,478,519 B1 | 11/2002 | Genick, II | |
| 7,019,215 B2 | 3/2006 | Arai | |
| 7,186,068 B2 | 3/2007 | Zoubek et al. | |

(Continued)

FOREIGN PATENT DOCUMENTS

| | | |
|---|---|---|
| AU | 71677/74 | 1/1976 |
| CN | 103748369 | 4/2014 |
| GB | 1144927 | 3/1969 |

OTHER PUBLICATIONS

International Search Report and Written Opinion of the International Searching Authority from corresponding PCT Application No. PCT/US2019/038243, dated Sep. 5, 2019 (15 pages).

(Continued)

*Primary Examiner* — Robert Sandy
*Assistant Examiner* — David M Upchurch
(74) *Attorney, Agent, or Firm* — Quarles & Brady LLP

(57) ABSTRACT

A fastening clip assembly configured to secure one or more components is provided. The fastening clip assembly includes a collar having a lower surface, a stem extending from the lower surface of the collar to a lead-in nose, a first leg having a first knuckle, and a second leg having a second knuckle. Further, the first leg and the second leg extend from the lead-in nose. The first knuckle is located a first distance from the lower surface of the collar, the second knuckle is located a second distance from the lower surface of the collar, and the first distance is different than the second distance.

20 Claims, 20 Drawing Sheets

(56) References Cited

U.S. PATENT DOCUMENTS

| | | |
|---|---|---|
| 8,037,582 B2 | 10/2011 | Okada et al. |
| 8,721,246 B2 | 5/2014 | Hirakawa |
| 9,145,909 B2 | 9/2015 | Lepper et al. |
| 9,593,701 B2 | 3/2017 | Cooley et al. |
| 2003/0159256 A1 | 8/2003 | Clarke |
| 2004/0052612 A1 | 3/2004 | Miura |
| 2004/0238203 A1 | 12/2004 | Arai |
| 2005/0079033 A1* | 4/2005 | Benedetti ............... F16B 21/086 411/508 |
| 2005/0244250 A1* | 11/2005 | Okada ................... F16B 21/086 411/508 |
| 2007/0172336 A1 | 7/2007 | Hsu |
| 2008/0066266 A1 | 3/2008 | Scroggie et al. |
| 2009/0060681 A1 | 3/2009 | Nakanishi |
| 2012/0213609 A1* | 8/2012 | Moerke ................. F16B 21/086 411/347 |
| 2017/0335877 A1* | 11/2017 | Steltz .................... F16B 5/0621 |

OTHER PUBLICATIONS

International Search Report and Written Opinion of the International Searching Authority from related PCT Application No. PCT/US2016/013595, dated Mar. 30, 2016 (10 pages).

\* cited by examiner

FASTENING CLIP ASSEMBLIES

CROSS REFERENCE TO RELATED APPLICATIONS

This application is based on, claims priority to, and incorporates herein by reference in its entirety U.S. Provisional Application Ser. No. 62/688,666, filed on Jun. 22, 2018, and entitled "Extended Range Fastener."

This application is also based on, claims priority to, and incorporates herein by reference in its entirety U.S. Provisional Application Ser. No. 62/688,667, filed on Jun. 22, 2018, and entitled "Extended Range Fastener."

REFERENCE REGARDING FEDERALLY SPONSORED RESEARCH OR DEVELOPMENT

Not applicable

SEQUENCE LISTING

Not applicable

BACKGROUND OF THE INVENTION

1. Field of the Invention

The present disclosure generally relates to fastening clip assemblies and, more particularly, fastener clip assemblies configured to secure a plurality of components together and fastener clip assemblies configured to secure a component at multiple positions or setup heights.

2. Description of the Background of the Invention

Fastener assemblies may be used in a variety of applications, including automobile manufacturing. For example, during a manufacturing process for a vehicle, various components may be secured together by a fastener or fastener assembly. Particular examples may include an interior frame panel that may be secured to an exterior door panel. Typically, components are secured together using one or more fasteners or fastener assemblies. Snap-fit assemblies may be used to connect components together and, in some instances, a fastener may be preassembled with a first component or panel, while additional components or panels may be connected to the preassembly later during assembly. A plurality of fasteners may be used to connect large components or panels together, and such fasteners may be provided in a variety of shapes and configurations suitable to the particular components to be connected.

One type of fastener that may be used to connect components together is a symmetrical connector having an insertion portion with a W-shape. W-shape fasteners provide quick and easy assembly and, in addition, W-shape fasteners may retain moldings of structural panels, while also being relatively easy to remove. Another type of fastener that may be used includes opposed securing members that axially collapse as the fastener is inserted into an opening of a panel. The axial collapsing of these securing members may allow the opposed securing members to pass through the opening of the panel during assembly.

Typically, the aforementioned fasteners are configured to connect components having a particular thickness and have limited variability to fasten together components having a range of thicknesses. A need therefore exists for a fastener or fastener assembly that can be easily used to fasten together components of varying thicknesses.

Further, once the aforementioned fasteners are secured to one or more components, there is usually a spacing or distance between the components, which may be defined as a setup height. However, typically the aforementioned fasteners provide limited setup heights and, in most instances, only include a single setup height. Therefore, a need also exists for a fastener or fastener assembly having a variable setup height, or a fastener or fastener assembly configured to accommodate and secure the one or more components at various positions on the fastener or fastener assembly.

SUMMARY OF THE INVENTION

In one aspect, a fastening clip assembly configured to secure one or more components is provided. The fastening clip assembly comprises a collar having a lower surface, a stem extending from the lower surface of the collar to a lead-in nose, a first leg having a first knuckle, and a second leg having a second knuckle. Further, the first leg and the second leg extend from the lead-in nose. The first knuckle is located a first distance from the lower surface of the collar, the second knuckle is located a second distance from the lower surface of the collar, and the first distance is different than the second distance.

In related embodiments, the fastening clip assembly further includes a third leg having a third knuckle and a fourth leg having a fourth knuckle. In these embodiments, the third knuckle is located a third distance from the lower surface of the collar, the fourth knuckle is located a fourth distance from the lower surface of the collar, and the third distance is different than the fourth distance. The first distance may also be equal to the third distance and the second distance may be equal to the fourth distance. In further embodiments, the first leg includes a first intermediate beam that extends between the lead-in nose and the first knuckle, the second leg includes a second intermediate beam that extends between the lead-in nose and the second knuckle, the third leg includes a third intermediate beam that extends between the lead-in nose and the third knuckle, and the fourth leg includes a fourth intermediate beam that extends between the lead-in nose and the fourth knuckle. Further, the first leg may include a first back-angle section, the second leg may include a second back-angle section, the third leg may include a third back-angle section, and the fourth leg may include a fourth back-angle section. In some embodiments, the fastening clip assembly may further include a brace between the first leg and the second leg, and a brace between the third leg and the fourth leg.

The fastening clip assembly may also include a support base and a post, which can extend between the collar and the support base. In such embodiments, the fastening clip assembly may be configured to secure a first component between the collar and the support base, and may secure a second component between the first and second legs and the lower surface of the collar. In particular, the fastening clip assembly may be configured to secure the second component between the first knuckle and the lower surface of the collar, or the fastening clip assembly may be configured to secure the second component between the second knuckle and the lower surface of the collar.

In another aspect, a fastening clip assembly comprising a collar and a panel-engaging retainer is provided. In this embodiment, the panel-engaging retainer includes a lead-in nose, a first leg having a first beam extending from the lead-in nose and to a first back-angle section, and a second leg having a second beam extending from the lead-in nose and to a second back-angle section. The panel-engaging retainer is connected to the collar, and the first beam is longer than the second beam.

In some aspects, the panel-engaging retainer further includes a third leg having a third beam that extends from the lead-in nose and to a third back-angle section, and a fourth leg having a fourth beam extending from the lead-in nose and to a fourth back-angle section. Further, the first leg may include a first knuckle between the first beam and the first back-angle section, the second leg may include a second knuckle between the second beam and the second back-angle section, the third leg may include a third knuckle between the third beam and the third back-angle section, and the fourth leg may include a fourth knuckle between the fourth beam and the fourth back-angle section. In these embodiments, the third beam may also be longer than the fourth beam. The panel-engaging retainer may further include a stem that extends between the collar and the lead-in nose, a first brace that extends between the first leg and the second leg, and a second brace that extends between the third leg and the fourth leg.

In some embodiments, the fastening clip assembly may further include a head, and a post that extends between the head and the collar. In these embodiments, the fastening clip assembly may be configured to secure a first component between the head and the collar, and may be configured to secure a second component between at least the second knuckle and the collar.

In a further aspect, another fastening clip assembly is provided. The fastening clip assembly comprises a head, a collar having an upper surface and a lower surface, and a panel-engaging retainer. The panel-engaging retainer includes a first leg, a second leg, a third leg, a fourth leg, and a stem extending from the lower surface of the collar to a lead-in nose. The first leg, the second leg, the third leg, and the fourth leg each include an outwardly-canting beam, an inwardly-canting beam, and a knuckle therebetween. Further, the knuckle of the first leg and the knuckle of the third leg are located a first distance from the lower surface of the collar, and the knuckle of the second leg and the knuckle of the fourth leg are located a second distance from the lower surface of the collar. In this embodiment, the first distance is different than the second distance, the first leg and the third leg are canter-corner relative to one another, and the second leg and the fourth leg are canter-corner relative to one another.

The foregoing and other aspects and advantages of the disclosure will appear from the following description. In the description, reference is made to the accompanying drawings, which form a part hereof, and in which there is shown by way of illustration a preferred configuration of the disclosure. Such configuration does not necessarily represent the full scope of the disclosure, however, and reference is made therefore to the claims herein for interpreting the scope of the disclosure.

BRIEF DESCRIPTION OF THE DRAWINGS

The present disclosure will be better understood and features, aspects, and advantages other than those set forth above will become apparent when consideration is given to the following detailed description thereof. Such detailed description makes reference to the following drawings.

Figure 1:
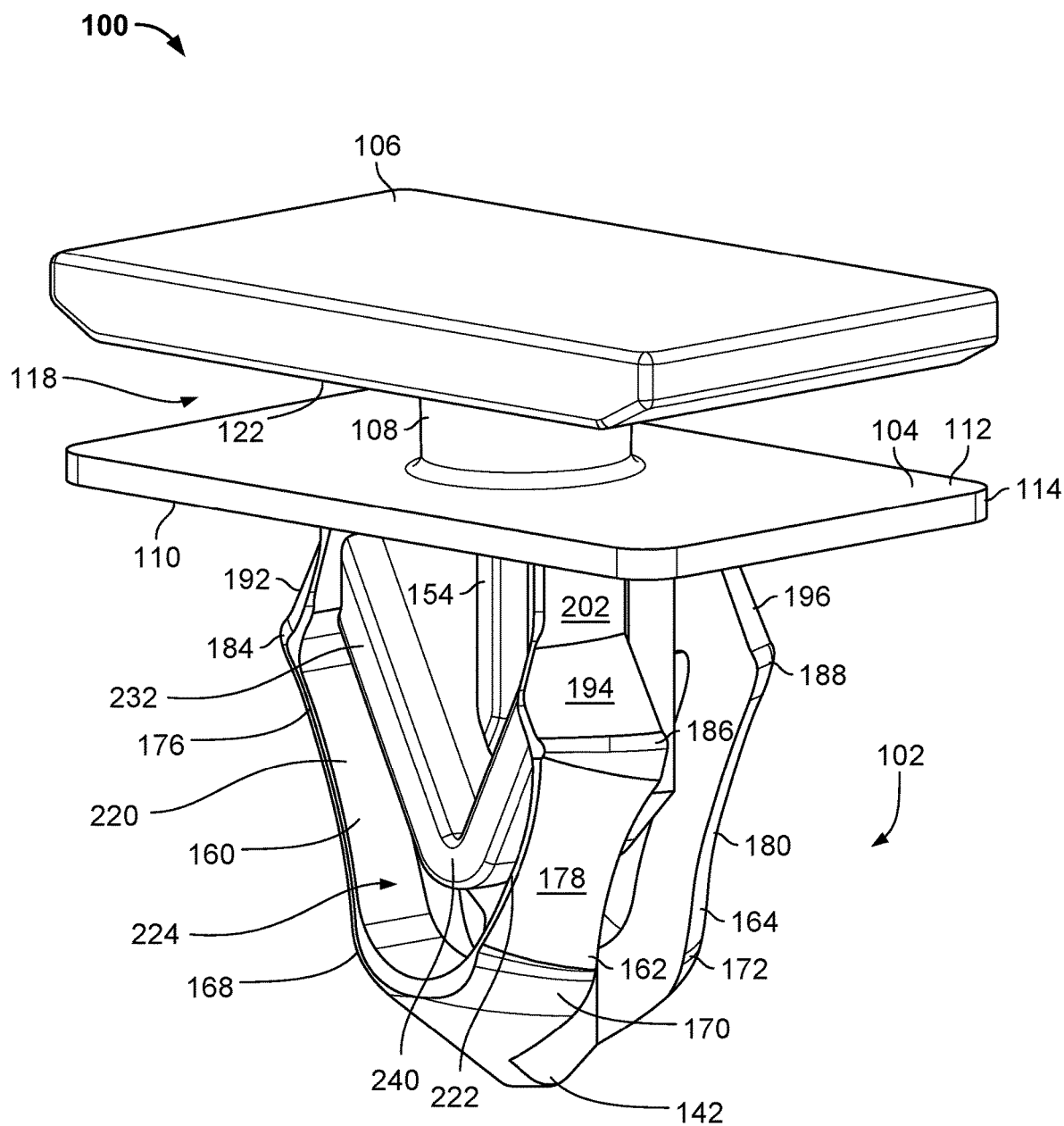
FIG. 1 is a top, right, and front isometric view of a first embodiment of a fastening clip assembly.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DRAWINGS

Certain embodiments of the present disclosure provide a fastening clip assembly that may be configured to engage and secure a plurality of components together, e.g., a first component and a second component. Various embodiments also provide a fastening clip assembly configured to engage and secure components having varying thicknesses, as well as a fastening clip assembly configured to secure components at multiple positions or setup heights.

Figure 6:
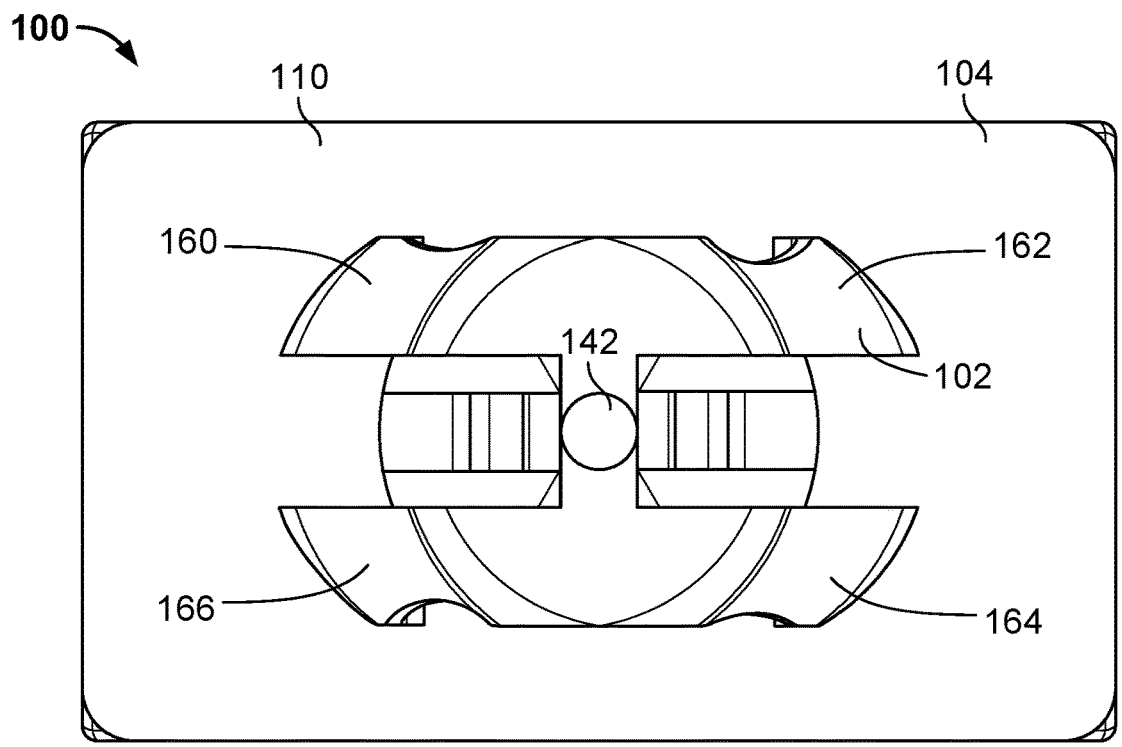
FIG. 6 is a bottom plan view of the fastening clip assembly of FIG. 1.
Figure 7:
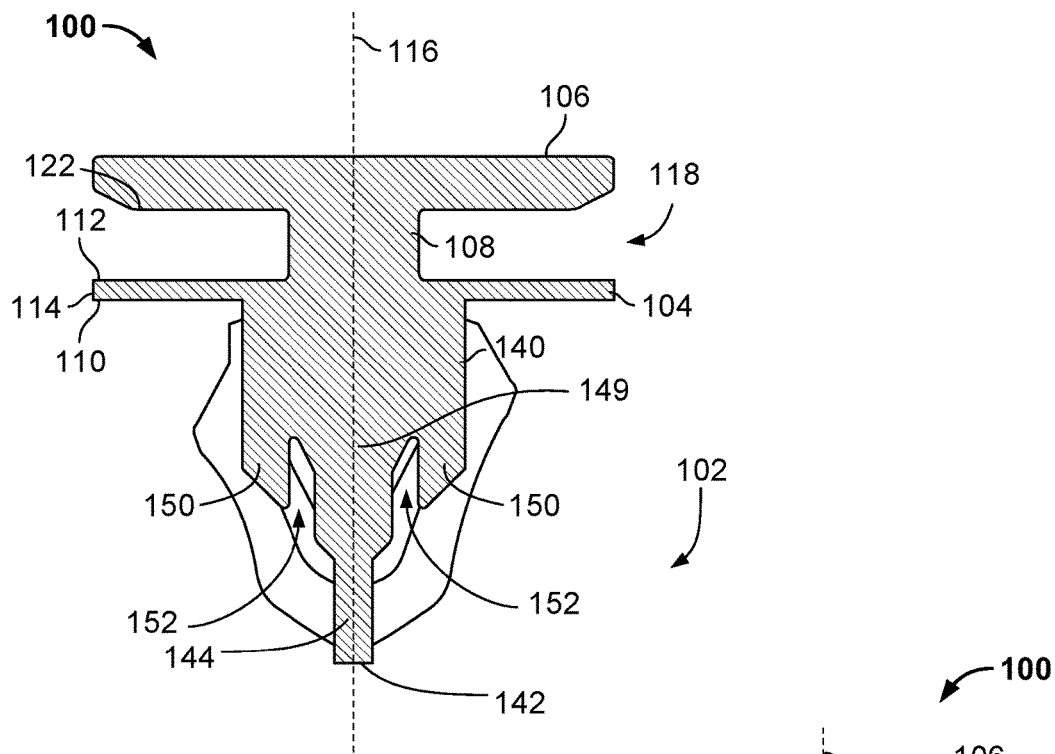
FIG. 7 is a cross-sectional view of the fastening clip assembly of FIG. 1, taken along line 7-7 of FIG. 5.
Figure 8:
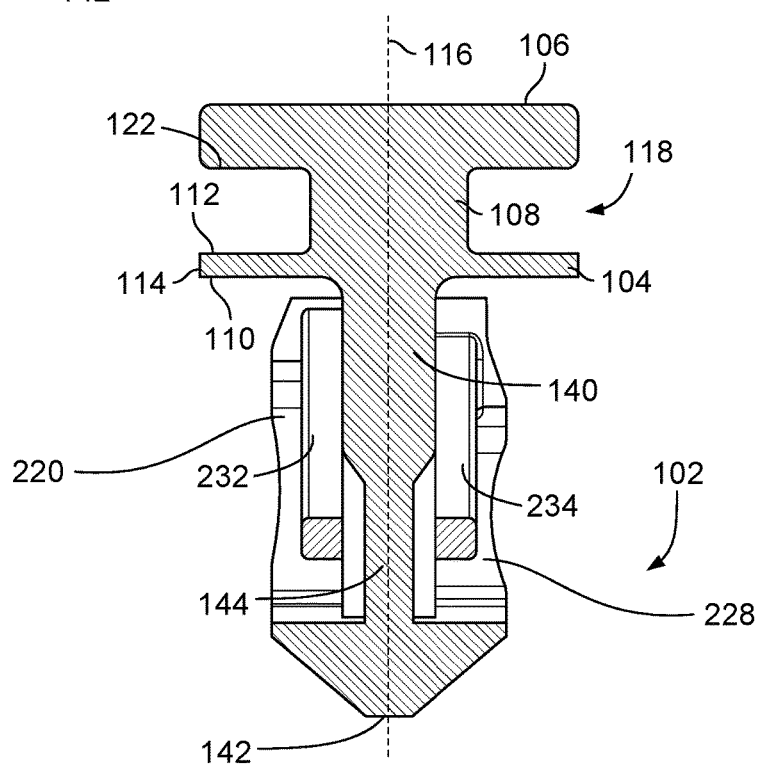
FIG. 8 is a cross-sectional view of the fastening clip assembly of FIG. 1, taken along line 8-8 of FIG. 5.

FIGS. 1-8 illustrate a fastening clip assembly 100, according to a first embodiment of the present disclosure. The fastening clip assembly 100 may include a panel-engaging retainer 102 integrally molded and formed with a collar 104, which, in turn, integrally connects to a support base 106 by way of a central post or neck 108. With particular reference to FIGS. 6-8, the collar 104 may be generally rectangular, and may include a lower surface 110 and an upper surface 112. Further, a distal wall 114 projects upwardly from the lower surface 110 and extends between the lower surface 110 and the upper surface 112. Similarly, with particular reference to FIGS. 5 and 7, the support base 106 may also be generally rectangular and, in this embodiment, may have a shape that conforms with the shape of the collar 104. Further, although the collar 104 and the support base 106 are generally rectangular in this embodiment, the collar 104 and the support base 106 may each, individually, be annular, square, conical, or any other desired shape.

As noted above, the central post 108 may extend between the collar 104 and the support base 106 and, as such, may connect the collar 104 to the support base 106. The central post 108 may also be generally aligned with a longitudinal axis 116. In this embodiment, the central post 108 is generally circular or cylindrical, and forms a spacing 118 between the collar 104 and the support base 106. The spacing 118 may provide a space or area into which a first component may be placed and affixed. For example, as will be further discussed herein, a first component, such as a first component or panel 120 (see FIG. 9), may be placed between the upper surface 112 of the collar 104 and a lower surface 122 of the support base 106. Further, the central post 108 may be placed within and may extend through an aperture 124 of the first component 120 and, as a result, the support base 106 and the collar 104 may engage and secure a first component therebetween.

In particular embodiments, the fastening clip assembly 100 may be integrally molded and may be formed as a single, unitary body. The fastening clip assembly 100 may be integrally molded and formed as a single piece using an injection-molded plastic, for example.

With particular reference to FIGS. 2-4, 7, and 8, the fastening clip assembly 100 may further include a central pedestal or stem 140 that extends downwardly from a center of the lower surface 110 of the collar 104. Further, as best shown in FIG. 7, the central stem 140 extends between the lower surface 110 of the collar 104 and a lead-in nose 142, and connects to the lead-in nose 142 by way of a shaft 144. As such, the central stem 140 may provide a brace that protects the lead-in nose 142 from collapsing toward the collar 104, and provides a bracing support that resists crushing of the panel-engaging retainer 102. The lead-in nose 142, in some embodiments, may be beveled and may be configured to guide the panel-engaging retainer 102 through or into an opening of a component, such as an opening or aperture 146 of a second component or panel 148 (see FIG. 9).

Figure 2:
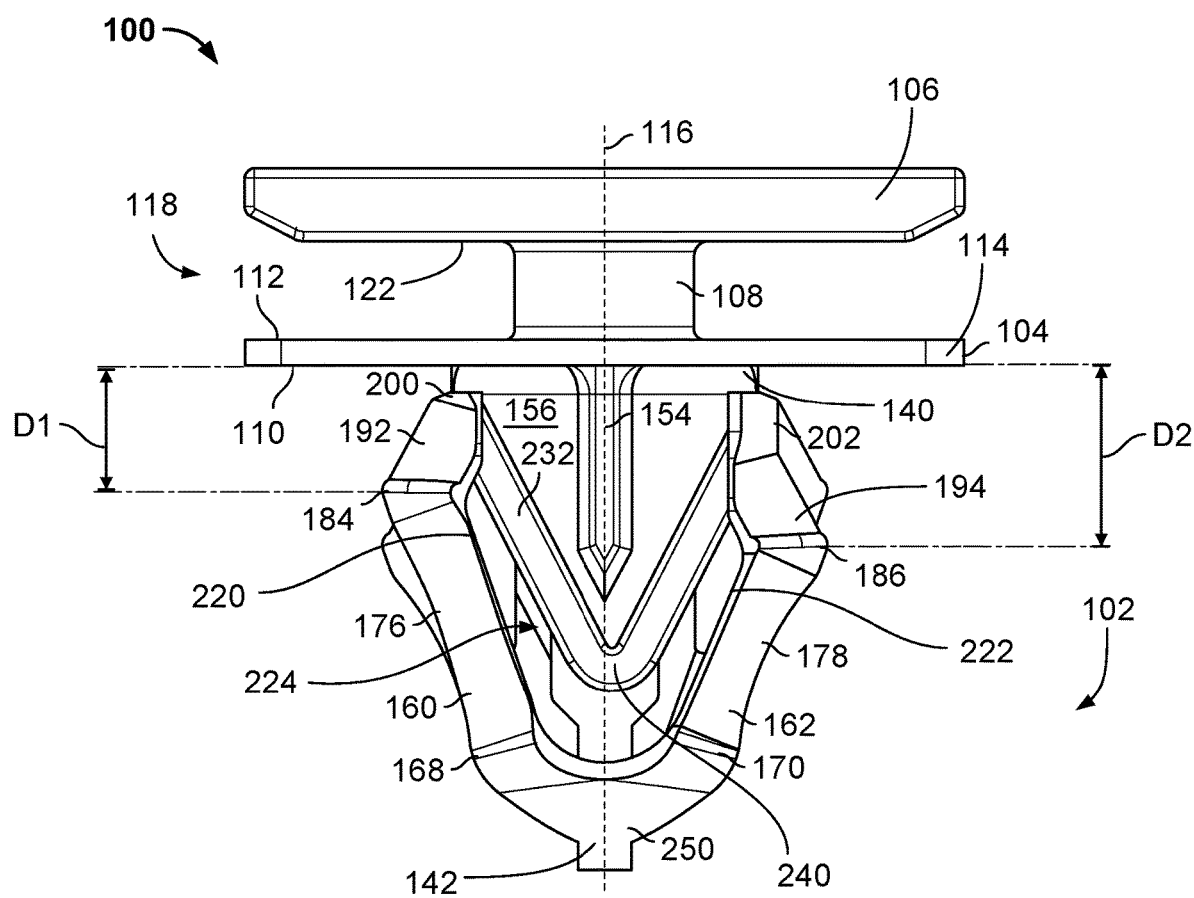
FIG. 2 is a front elevational view of the fastening clip assembly of FIG. 1.
Figure 3:
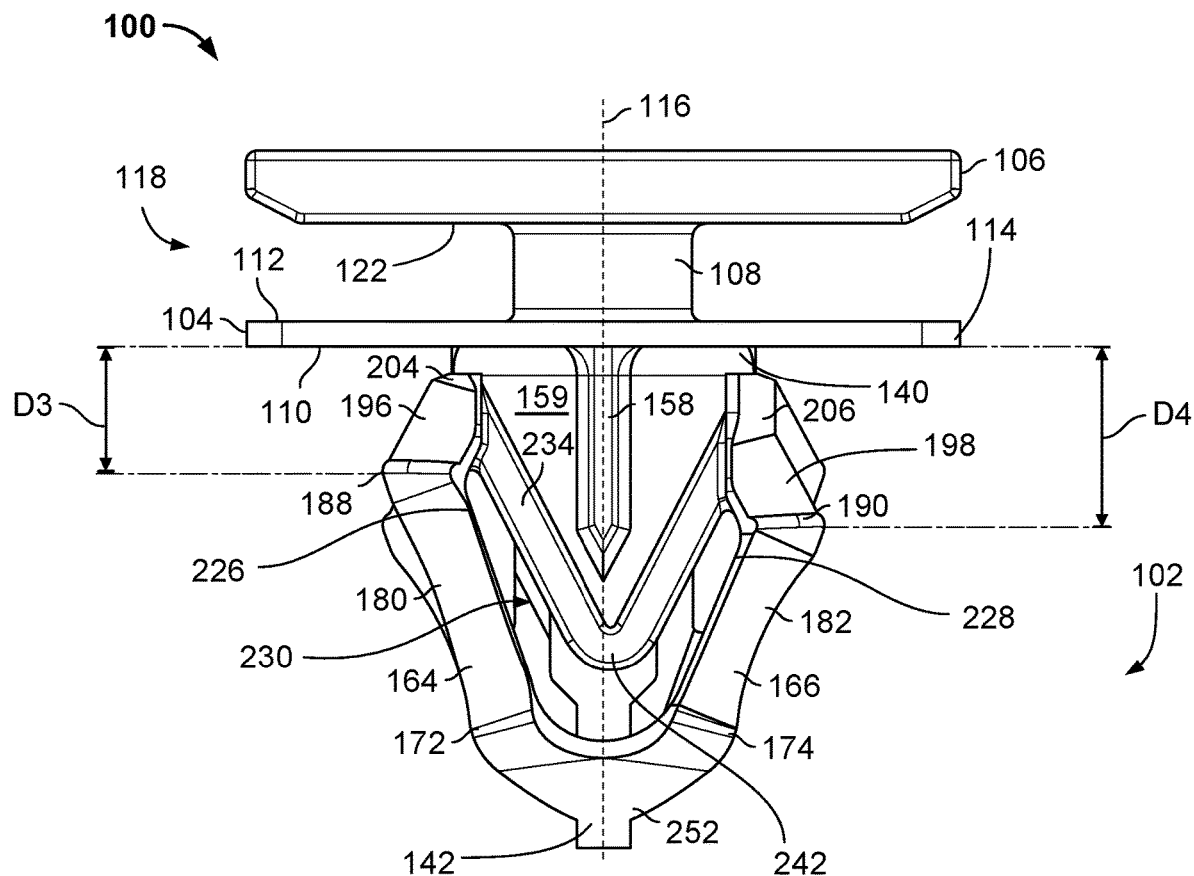
FIG. 3 is a rear elevational view of the fastening clip assembly of FIG. 1.
Figure 4:
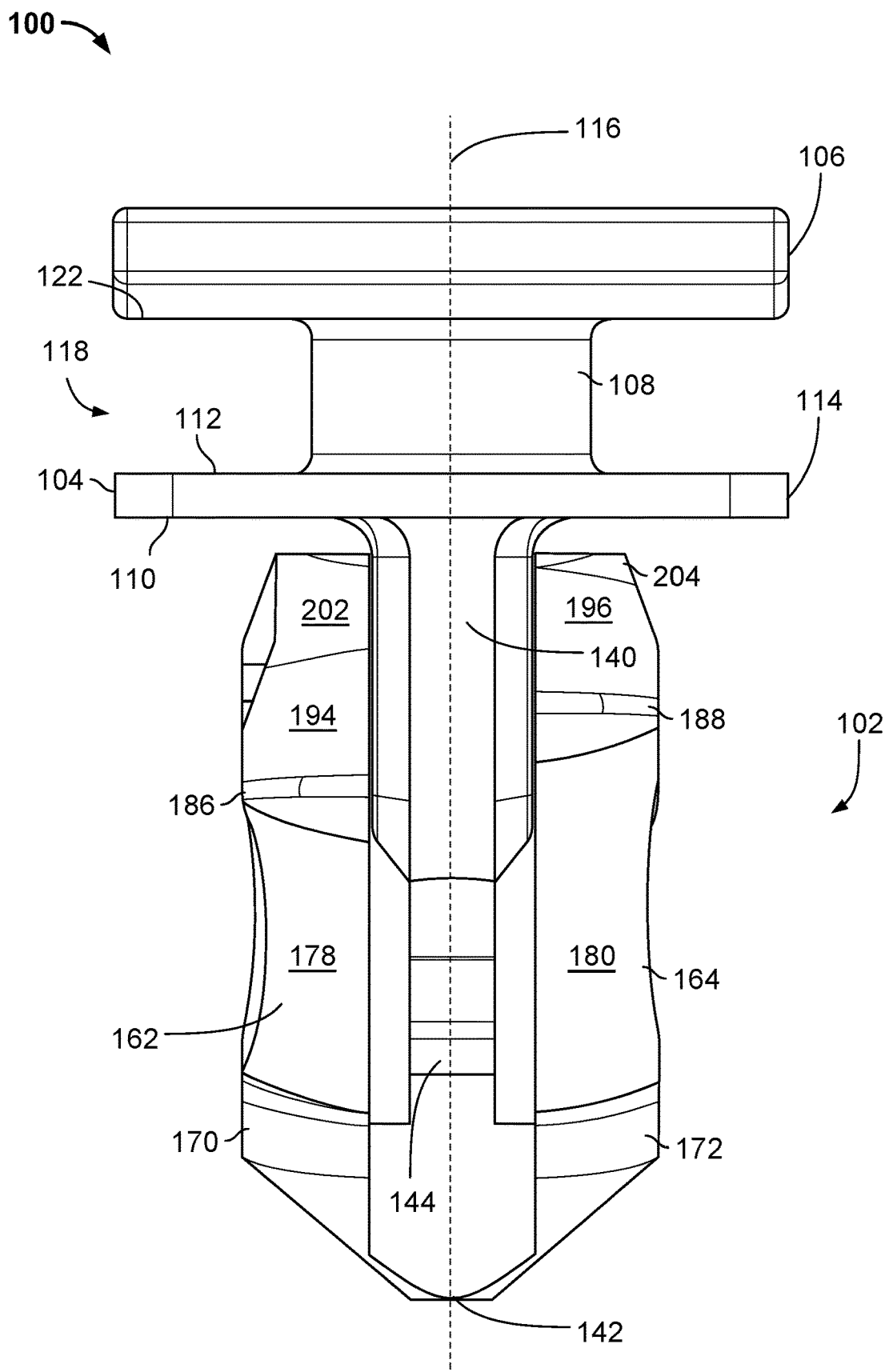
FIG. 4 is a right side elevational view of the fastening clip assembly of FIG. 1.
Figure 5:
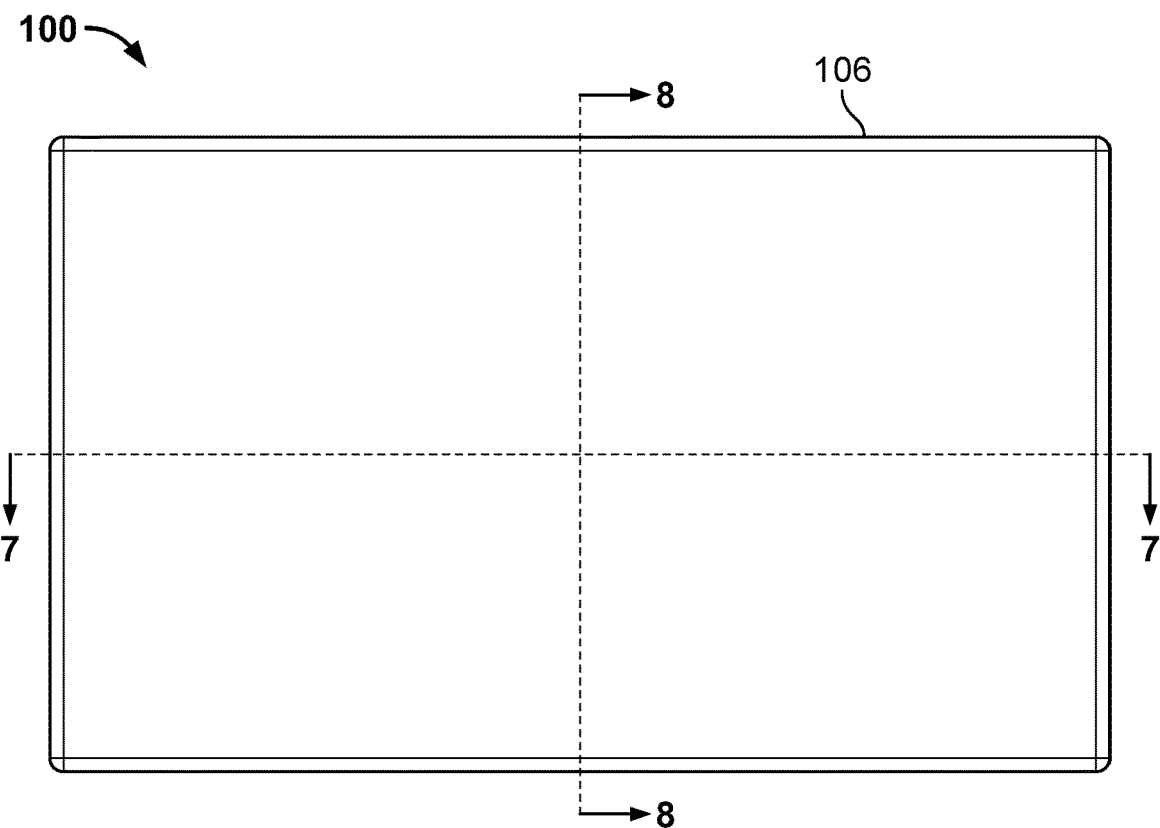
FIG. 5 is a top plan view of the fastening clip assembly of FIG. 1.

The central stem 140 may also be centered about the longitudinal axis 116 and may be generally aligned with the central post 108. Further, as best shown in FIGS. 7 and 8, the central stem 140 may be symmetrical about the longitudinal axis 116 (e.g., to the left and right of the longitudinal axis 116 and/or to the top and bottom of the longitudinal axis 116, as shown and seen in FIG. 7). Referring to FIG. 7, the central stem 140 may include a solid medial section or central beam 149 and two lateral prongs or beams 150. Put differently, the central stem 140 may include two cut-out sections 152 proximate a lower end of the central stem 140 that define the two lateral prongs 150. Further, the cut-out sections 152 extend between the medial section 149 and the lateral prongs 150, and may be present to accommodate or support slides during the molding process. As best shown in FIGS. 2 and 3, the central stem 140 may also include a cross brace 154 coupled to a front surface 156 of the central stem 140 and a cross brace 158 coupled to a rear surface 159 of the central stem 140.

The panel-engaging retainer 102 may further include a plurality of wings or retaining legs that extend upward from the beveled lead-in nose 142 and/or outward from an end of the central pedestal or stem 140. More particularly, the fastening clip assembly 100 may include a first leg 160, a second leg 162, a third leg 164, and a fourth leg 166 that extend upward and outward from the lead-in nose 142 and/or the central stem 140. Each leg 160, 162, 164, 166 may each individually include a flexible base portion or root 168, 170, 172, 174 that is proximate a lower end of the legs 160, 162, 164, 166, respectively. Further, as best shown in FIGS. 1-3, the flexible roots 168, 170, 172, 174 extend from the lead-in nose 142 and connect to an intermediate extension beam 176, 178, 180, 182 having generally concave outer surfaces. In particular, the first leg 160, the second leg 162, the third leg 164, and the fourth leg 166 each include an intermediate extension beam 176, 178, 180, 182, respectively, that extends upward and outwardly from the flexible roots 168, 170, 172, 174, respectively, toward a knuckle 184, 186, 188, 190. The intermediate extension beams 176, 178, 180, 182 each have an outward extension that increases moving from the flexible roots 168, 70, 172, 174 to knuckles 184, 186, 188, 190.

With continued reference to FIGS. 1-3, the knuckles 184, 186, 188, 190 may be, in turn, further connected to a ramped section or back-angle section 192, 194, 196, 198, respectively, that is inwardly-canting or angles inwardly toward the central stem 140 and the collar 104. As a result, the knuckles 184, 186, 188, 190 are a vertex between the extension beams 176, 178, 180, 182 and the back-angled sections 192, 194, 196, 198, and may be defined by an interior angle. In some instances, the knuckles 184, 186, 188, 190 may be final retention features at a lower end of the back-angled sections 192, 194, 196, 198 that are positioned between the back-angled sections 192, 194, 196, 198 and the lead-in nose 142. However, in some embodiments, the knuckles 184, 186, 188, 190 may not be present altogether. As such, particular reference to the knuckles 184, 186, 188, 190 herein, may also be in reference to the location along the legs 160, 162, 164, 166, respectively, at which point the intermediate extension beams 176, 178, 180, 182 connect or transition to the back-angle sections 192, 194, 196, 198. Alternatively, particular reference to the knuckles 184, 186, 188, 190 herein, may be in reference to the portion of the legs 160, 162, 164, 166 that is farthest from the longitudinal axis 116 or the portion of the legs 160, 162, 164, 166 having the widest width.

The legs 160, 162, 164, 166 may further include a tab 200, 202, 204, 206 that extends upwardly from the back-angle sections 192, 194, 196, 198 and toward the lower surface 110 of the collar 104. As best shown in FIGS. 2 and 3, a spacing may also be present between the tabs 200, 202, 204, 206 and the lower surface 110 of the collar 104.

Referencing FIGS. 1-3 and 8, an interior surface 220 of the first leg 160 and an interior surface 222 of the second leg 162 may define a generally parabolic aperture 224 (see FIGS. 1 and 2), and an interior surface 226 of the third leg 164 and an interior surface 228 of the fourth leg 166 may define a generally parabolic aperture 230 (see FIG. 3). A center leg or brace 232 may span between the first leg 160 and the second leg 162 and may extend across the aperture 224, and a center leg or brace 234 may span between the third leg 164 and the fourth leg 166 and may extend across the aperture 230. More particularly, as best shown in FIGS. 1, 2, and 8, the brace 232 may extend from and between an interior surface of the back-angle section 192 of the first leg 160 and an interior surface of the back-angle section 194 of the second leg 162, and the brace 234 may extend from and between an interior surface of the back-angle section 196 of the third leg 164 and an interior surface of the back-angle section 198 of the fourth leg 164. Further, in particular embodiments, the center leg or brace 232 and the center leg or brace 234 may each be, individually, V-shaped, as shown in FIGS. 2 and 3.

In further embodiments, the brace 232 may extend downward from the back-angle section 192 of the first leg 160 and downward from the back-angle section 194 of the second leg 162, and toward a vertex or lower distal end 240 positioned between the first and second legs 160, 162, and the brace 234 may extend downward from the back-angle section 196 of the third leg 164 and downward from the back-angle section 198 of the fourth leg 166, and toward a vertex or lower distal end 242 positioned between the third and fourth legs 164, 166. Further, the vertex 240 may be located at a central position between the first leg 160 and the second leg 162, and the vertex 242 may be located at a central position between the third leg 164 and the fourth leg 166. The vertex 240 and the vertex 242 may also be centrally aligned with the longitudinal axis 116 and may be positioned above the lead-in nose 142. In other embodiments, the vertex 240 and the vertex 242 may be slightly offset relative to the longitudinal axis 116 and may be in closer proximity to the second leg 162 and the fourth leg 166, respectively. As will be further discussed herein, the brace 232 may function to support the first leg 160 and the second leg 162 and may function to distribute a load therebetween. Similarly, the brace 234 may function to support the third leg 164 and the fourth leg 166 and may function to distribute a load therebetween.

The retaining legs 160, 162, 164, 166 may also be regularly spaced about or around the central stem 140. Further, as shown in FIGS. 2 and 3, the first leg 160 and the second leg 162 may extend from a front face 250 of the lead-in nose 142, and the third leg 164 and the fourth leg 166 may extend from a rear face 252 of the lead-in nose 142. Further, with particular reference to FIG. 2, the knuckle 184 of the first leg 160 and the knuckle 186 of the second leg 162 may be offset relative to one another. More particularly, in this embodiment, the knuckle 186 of the second leg 162 is positioned closer to the lead-in nose 142 in relation to the knuckle 184 of the first leg 160. As a result, the intermediate extension beam 178 of the second leg 162 is shorter than the intermediate extension beam 176 of the first leg 160, or the back-angle section 192 and/or the tab 200 of the first leg 160 is shorter than the back-angle section 194 and/or the tab 202 of the second leg 162. Similarly, with reference to FIG. 3, the knuckle 188 of the third leg 164 and the knuckle 190 of the fourth leg 166 are offset relative to one another and, in this embodiment, the knuckle 190 of the fourth leg 166 is positioned closer to the lead-in nose 142 in relation to the knuckle 188 of the third leg 164. As a result, the intermediate extension beam 182 of the fourth leg 166 is shorter than the intermediate extension beam 180 of the third leg 164, and/or the back-angle section 196 and/or the tab 204 of the third leg 164 is shorter than the back-angle section 198 and/or the tab 206 of the fourth leg 166.

As discussed above, the knuckles 184, 186, 188, 190 of the fastening clip assembly 100 may be generally spaced from a lower surface 110 of the collar 104. For example, in this particular embodiment, the knuckle 184 of the first leg 160 may be spaced a distance D1 from the lower surface 110 of the collar 104, and the knuckle 186 of the second leg 162 may be spaced a distance D2 from the lower surface 110 of the collar 104. Further, the knuckle 188 of the third leg 164 may be spaced a distance D3 from the lower surface 110 of the collar 104, and the knuckle 190 of the fourth leg 166 may be spaced a distance D4 from the lower surface 110 of the collar 104. As previously discussed herein, the knuckles 184, 186, 188, 190 may not be present in some embodiments and, in such embodiments, the distances D1, D2, D3, D4 may be measured from the lower surface 110 of the collar 104 to a lower end of the back-angled sections 192, 194, 196, 198, respectively.

In one particular embodiment, as shown in FIGS. 2 and 3, the distance D1 is less than the distance D2 and, specifically, the distance D1 may be approximately half to ⅔rds the distance D2. Further, in this particular embodiment, the distance D3 is less than the distance D4 and, specifically, the distance D3 may be approximately half to ⅔rds the distance D4. Even further, in this embodiment, the distance D1 may be equal to the distance D3 and the distance D2 may be equal to the distance D4. In other embodiments, the distance D1 and the distance D3 may be approximately ¼th, or approximately ⅓rd, or approximately ⅔rds, or approximately ¾ths of the distance D2 and/or the distance D4. In further embodiments, as will be appreciated by those skilled in the art, the distance D1 and distance D3 may be a predetermined distance large enough to accommodate and secure a component having a first thickness. In particular, the fastener clip assembly 100 may accommodate a component between the knuckles 184, 188 and the lower surface 110 of the collar 104, such that the component engages the back-angled sections 192, 196 and/or the knuckles 184, 188. Additionally, the distance D2 and the distance D4 may be a predetermined distance large enough to accommodate and secure a component having a second thickness, which may be larger than the distance D1 and/or the distance D3. In this embodiment, the fastener clip assembly 100 may accommodate the component having the second thickness between the knuckles 186, 190 and the lower surface 110 of the collar 104, such that the component engages the back-angled sections 194, 198 and/or the knuckles 186, 190.

In other embodiments, as will be further discussed herein, the distance D2 and the distance D4 may be a predetermined distance large enough to accommodate and secure a plurality of components having a combined thickness, all of which may be secured by the fastening clip assembly 100. For example, a first component may engage and be secured by the back-angled sections 192, 196 and/or the knuckles 184, 188, and may have a relative thickness equal to or less than the distances D1 and/or D3, and a second component may be secured between the knuckles 186, 190 and a lower surface of the first component secured by the back-angled sections 192, 196 and/or the knuckles 184, 188. In such embodiments, the distances D2 and D4 may be relatively equal to or greater than the combined thicknesses of all of the components secured between the knuckles 186, 190 and the lower surface 110.

In further embodiments, the distances D1, D2, D3, D4 may each, individually, be spaced a predetermined distance from the lower surface 110 of the collar 104. For example, in one embodiment, the distances D1, D2, D3, D4 may be equal. In an alternative embodiment, the distance D1 may be different than the distances D2, D3, D4, all of which may be equal. In another embodiment, as previously discussed herein, the distance D1 and the distance D3 may be equal and the distance D2 and the distance D4 may be equal, and the distances D1, D3 may be different than the distances D2, D4. Alternatively, the distance D1 and the distance D2 may be equal and the distance D3 and the distance D4 may be equal, and the distances D1, D2 may be different than the distances D3, D4. Further, the distances D1 and the distance D4 may be equal and the distance D2 and the distance D3 may be equal, and the distances D1, D4 may be different than the distances D2, D3. In yet another embodiment, two of the distances D1, D2, D3, D4 may be equal, while the other two distances may be different. Still further, the distances D1, D2, D3, D4 may all be different from one another.

The inclusion of legs having knuckles located at various heights along the legs and/or the inclusion of legs having back-angles and/or tabs located at varying heights increases the range of components the fastening clip assembly 100 may secure. For instance, the second leg 162 and the fourth leg 166, may accommodate, engage, and secure panels having a first thickness, and the first leg 160 and the third leg 164, may accommodate, engage, and secure panels having a second thickness that is different than the first thickness accommodated by the legs 162, 166.

Figure 10:
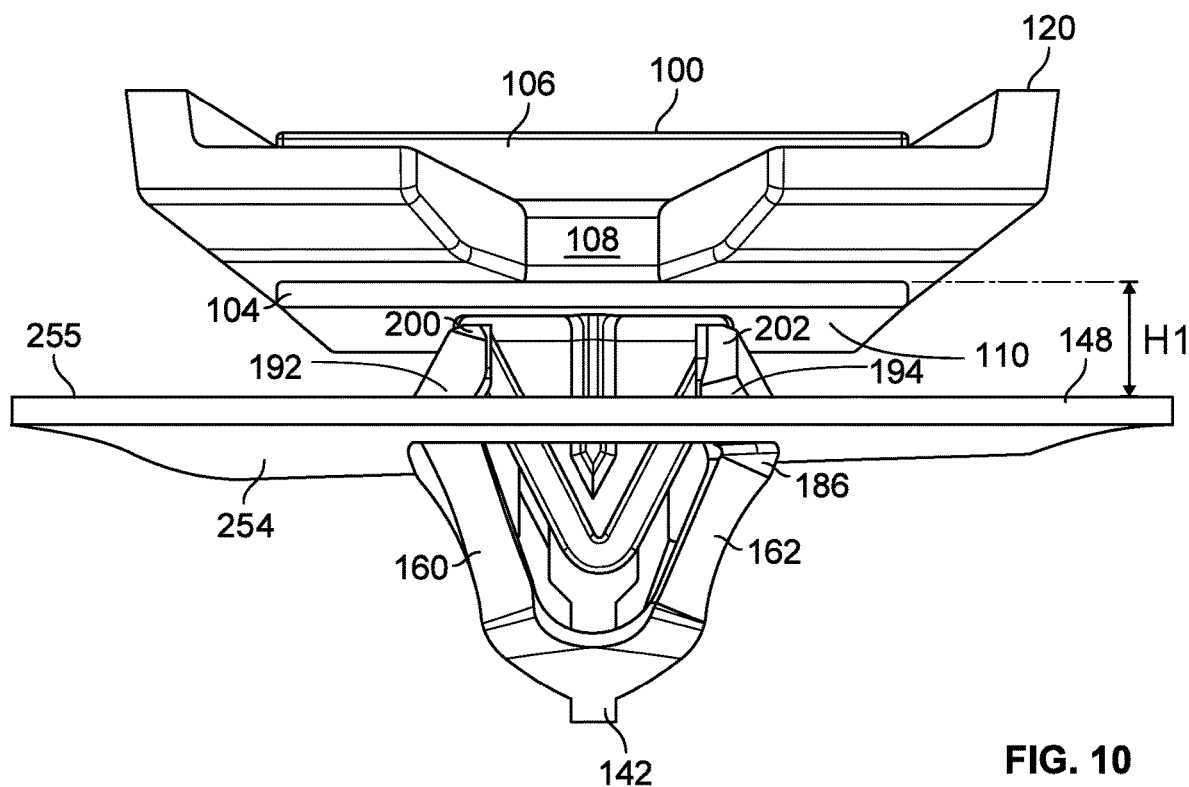
FIG. 10 depicts the fastening clip assembly of FIG. 9 showing the first and second components at their maximum potential setup height.
Figure 11:
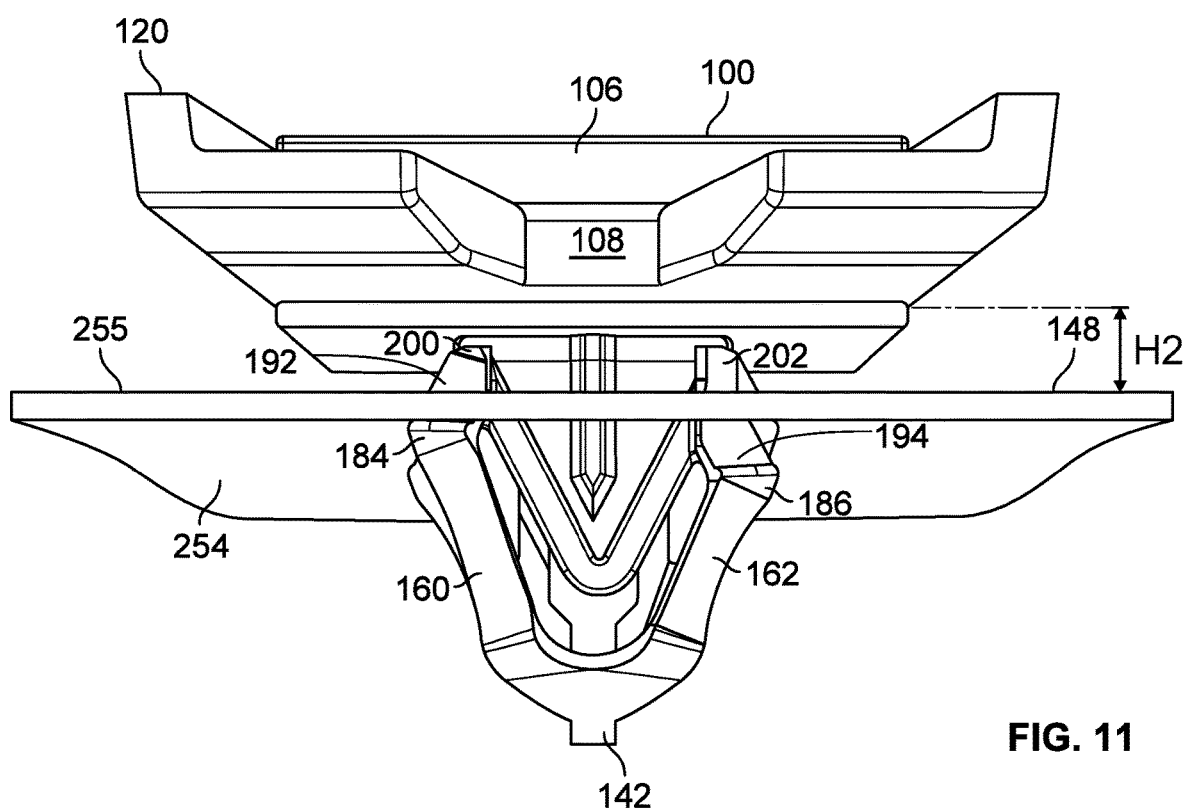
FIG. 11 depicts the fastening clip assembly of FIG. 9 showing the first and second components at an intermediate potential setup height.

Further, the inclusion of legs having knuckles located at various heights along the legs and/or the inclusion of legs having back-angles located at varying heights may increase the setup height variation of the fastener clip assembly 100. The setup height may be defined as the spacing or distance between the components to be secured by the fastener clip assembly 100, e.g., first component 120 and second component 148. And, as will be further discussed herein, the inclusion of legs having knuckles located at various heights along the legs and/or the inclusion of legs having back-angles located at varying heights increases the locations at which the panel-engaging retainer 102 (and the legs 160, 162, 164, 166 thereof) may engage and secure a component thereon. As a result, the fastener clip assembly 100 may have multiple setup heights. For example, as shown in FIGS. 10 and 11, the second component 148 may engage the back-angle section 194 and have a setup height H1 (see FIG. 10) or the second component 148 may engage the back-angle section 192 and have a setup height H2 (see FIG. 11).

Turning back to FIGS. 2 and 3, the legs having knuckles closer to the lead-in nose 142 (e.g., legs 162, 166) and the legs having knuckles closer to the lower surface 110 (e.g., legs 160, 164) may be staggered. Or, put another way, the legs disposed around the panel-engaging retainer 102 may alternate between legs having knuckles closer to the lead-in nose 142 (e.g., legs 162, 166) and legs having knuckles closer to the lower surface 110 (e.g., legs 160, 164). For instance, the first leg 160 may be kitty-corner or cater-cornered relative to the third leg 164 (or vice-versa), and the second leg 162 may be kitty-corner or cater-corned relative to the fourth leg 166 (or vice-versa). As will be further discussed herein, having the first leg 160 and the third leg 164 cater-cornered and the second leg 162 and the fourth leg 166 cater-corned may equally distribute a load across the fastening clip assembly 100.

Further, as previously discussed herein, the fastening clip assembly 100 may include a center leg or brace 232 that spans between the first leg 160 and the second leg 162, and a center leg or brace 234 that spans between the third leg 164 and the fourth leg 166. Therefore, during use, the brace 232 may function to distribute a load between the first leg 160 and the second leg 162, and the brace 234 may function to distribute a load between the third leg 164 and the fourth leg 166. More particularly, as discussed above, the fastening clip assembly 100 may engage and secure a component between the first leg 160 and lower surface 110 of the collar 104, and between the third leg 164 and the lower surface 110 of the collar 104, in some embodiments. In such embodiments, a load or force applied to the first leg 160 (or the knuckle 184 thereof) and the third leg 164 (or the knuckle 188 thereof) may be greater than a load or force applied to the second leg 162 (or the knuckle 186 thereof) and the fourth leg 166 (or the knuckle 190 thereof). As such, when a force or load is applied to the first leg 160 and the third leg 164 during use, the braces 232, 234 may distribute a portion of the load to the second leg 162 and the fourth leg 166. Alternatively, in other embodiments, the fastening clip assembly 100 may engage and secure a component between the second leg 162 and lower surface 110 of the collar 104, and between the fourth leg 166 and the lower surface 110 of the collar 104. In these embodiments, a load or force applied to the second leg 162 (or the knuckle 186 thereof) and the fourth leg 166 (or the knuckle 190 thereof) may be greater than a load or force applied to the first leg 160 (or the knuckle 184 thereof) and the third leg 164 (or the knuckle 188 thereof). As such, when a force or load is applied to the second leg 162 and the fourth leg 166 during use, the braces 232, 234 may distribute a portion of the load to the first leg 160 and the third leg 164.

FIGS. 9-14 illustrate a method of using the fastening clip assembly 100 and, in particular, a process in which the fastening clip assembly 100 fastens or secures a first component 120, e.g., a first panel, together with a second component 148, e.g., a second panel, and optionally, a third component 253 (see FIG. 14), e.g., a third panel.

Figure 9:
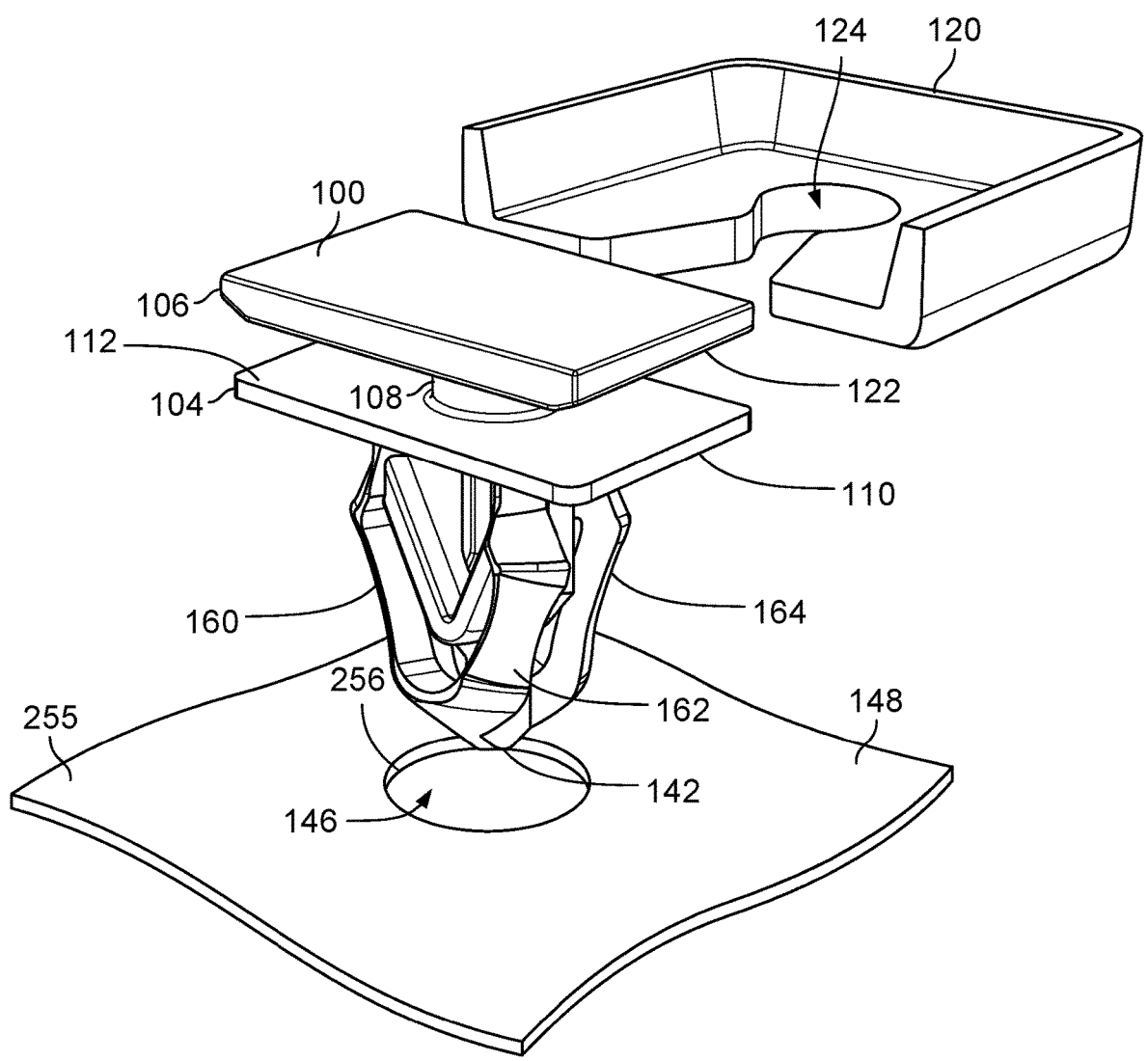
FIG. 9 is the fastening clip assembly of FIG. 1 aligned with an aperture of a first and second component.

First, as shown in FIG. 9, a user may align the fastening clip assembly 100 with one or more holes or apertures, e.g., the aperture 124 of the first component 120 and the aperture 146 of the second component 148. Then, a user may push the first component 120 toward the central stem 108 so that the first component 120 snaps in engagement with the fastening clip assembly 100 (see FIG. 10). Once engaged, the central stem 108 of the fastening clip assembly 100 may extend through the aperture 124 of the first component 120, and the first component 120 may be positioned and secured between the collar 104 and the support base 106.

Next, the lead-in nose 142 of the fastening clip assembly 100 may be urged into and through the aperture 146 of the second component 148 until the second component 148 is positioned between the knuckles 186, 190 and the lower surface 110 of the collar 104 (e.g., see FIG. 10), or until the second component 148 is positioned between the knuckles 184, 188 and the lower surface 110 of the collar 104 (e.g., see FIG. 11). As previously discussed, the second component 148 may have a variety of thicknesses, and depending on the thickness of the second component 148, either the legs 160, 164 or the legs 162, 168 may engage a lower surface 254 of the second component 148. Alternatively, as also previously discussed herein, multiple setup heights between the first component 120 and the second component 148 may be desired. And depending on the desired setup height, either the legs 160, 164 or the legs 162, 168 may engage a lower surface 254 of the second component 148.

The legs 160, 162, 164, 166 (as well as the first brace 232 and the second brace 234) may flex or compress inwardly toward the longitudinal axis 116 as the fastening clip assembly 100 is urged through the second aperture 146 of the second component 148. The fastening clip assembly 100 may be continuously urged through the second aperture 146 of the second component 148 until the knuckles 184, 188 and/or the knuckles 186, 190 pass through the second aperture 146, as shown in FIGS. 10 and 11. In particular embodiments, the lower surface 110 of the collar 104 may also abut against an upper surface 255 of the second component 148, which surrounds the second aperture 146.

As further shown in FIGS. 10-14, the back-angle sections 192, 194, 196, 198 and/or the tabs 200, 202, 204, 206 of the legs 160, 162, 164, 166 may extend through and engage an interior edge 256 (see FIG. 9) of the second aperture 146 or the lower surface 254 of the second component 148. For example, as shown in FIG. 10, the back-angle section 194 of the leg 162 may extend through the second aperture 146 and an outer surface of the back-angle section 194 may contact or engage the interior edge 256 of the second aperture 146. As previously mentioned herein, the thickness of the second component 148 may vary and the fastening clip assembly 100 may be used to fasten together components having varying thicknesses. However, in particular embodiments, the second component 148 may have a thickness relatively equal to or smaller than the distance D1 and the distance D3 (see FIG. 10, for example), or a thickness relatively equal to or smaller than the distance D2 and the distance D4 (see FIG. 13, for example).

Figure 12:
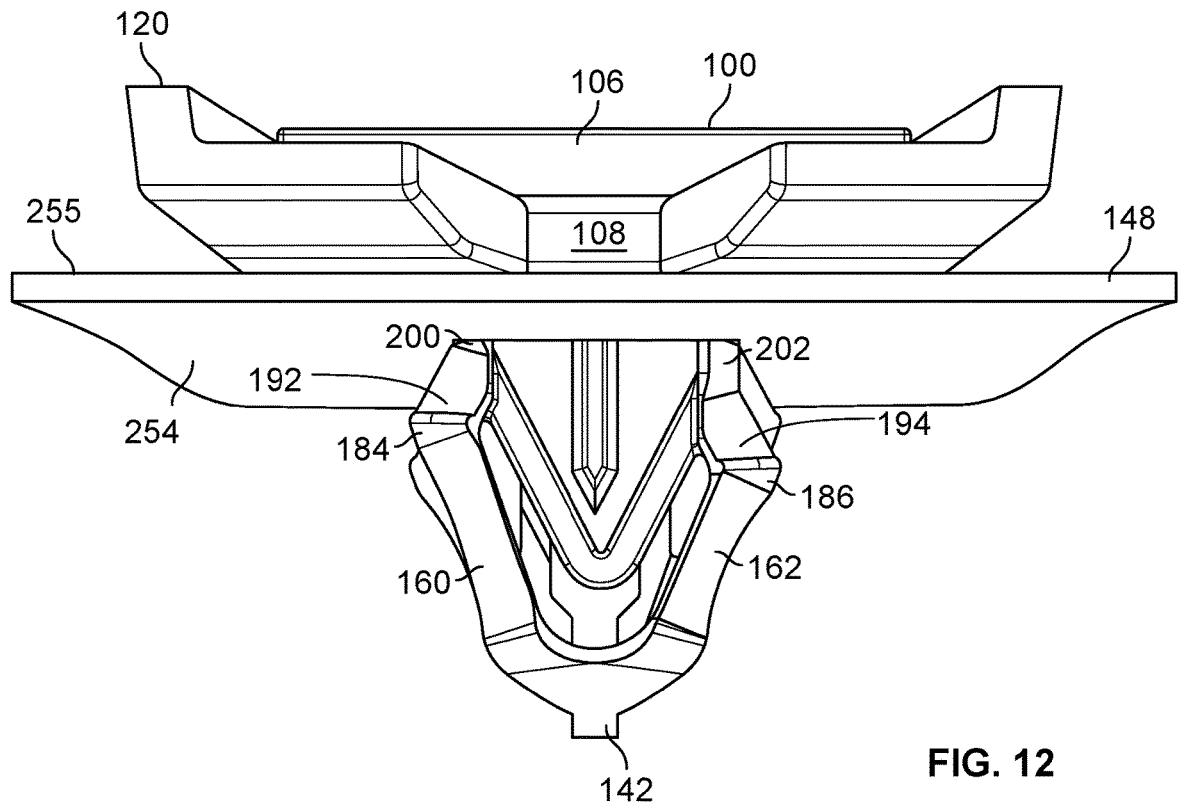
FIG. 12 depicts the fastening clip assembly of FIG. 9 showing the first and second components at their minimum potential setup height.
Figure 13:
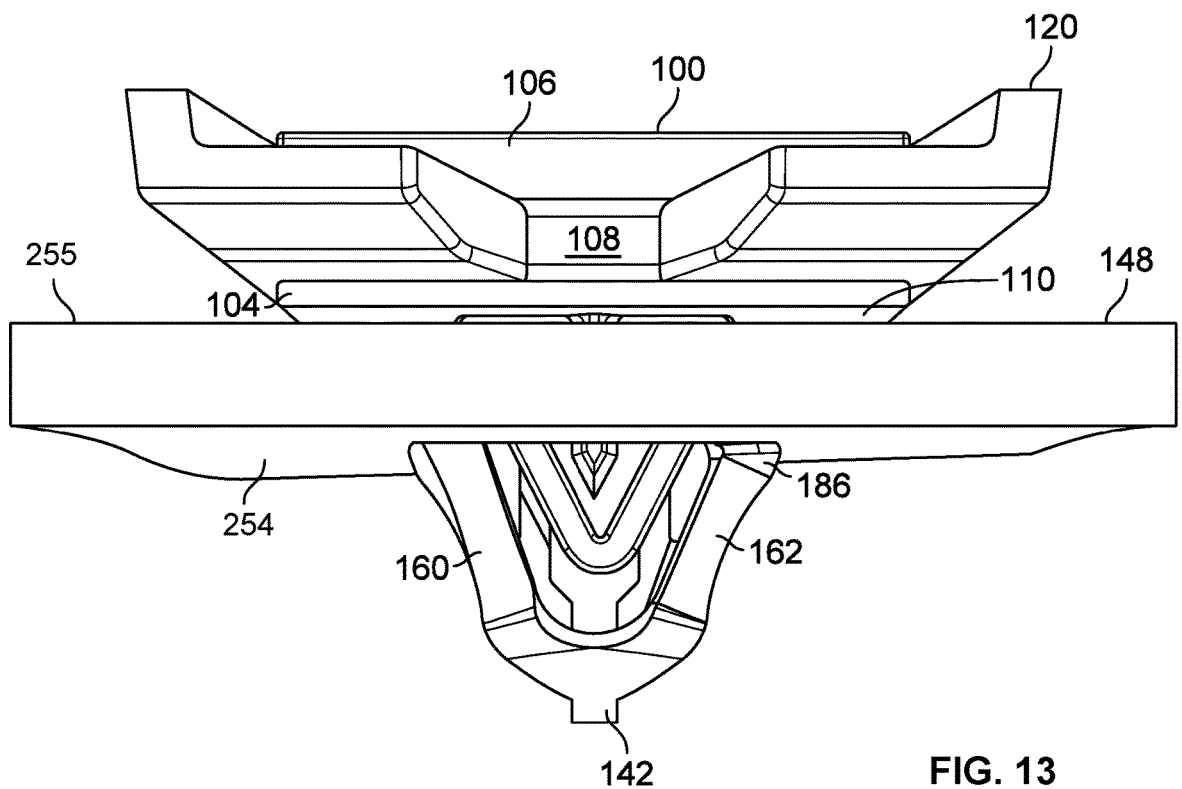
FIG. 13 depicts the fastening clip assembly of FIG. 1 mated with a first and second component.
Figure 14:
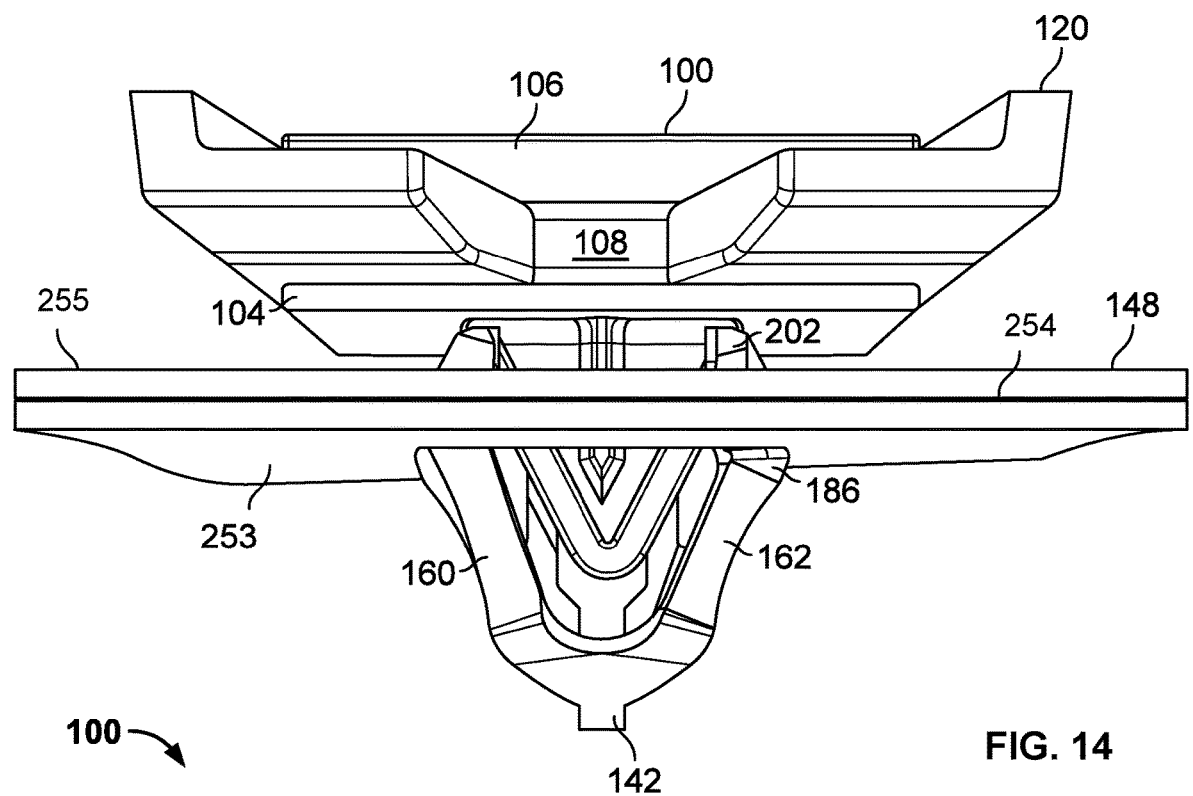
FIG. 14 depicts the fastening clip assembly of FIG. 1 mated with a first component, a second component, and a third component.

Further, as previously discussed herein, the inclusion of legs having knuckles located at various heights along the legs and/or the inclusion legs having back-angles located at various heights may increase the setup height variation of the fastener clip assembly 100. For example, as shown in FIGS. 10-12, the fastener clip assembly 100 may have a first setup height H1 (see FIG. 10), a second setup height H2 (see FIG. 11), and a third setup height (see FIG. 12). More particularly, in the embodiments shown in FIGS. 10-12, the first setup height H1 is the maximum potential setup height, the second setup height H2 is an intermediate setup height, and the third setup height (not shown) is the minimum setup height, which may be relatively equal to a thickness of the collar 104.

In other embodiments, after the second component 148 is positioned between the knuckles 184, 188 (as shown in FIG. 11), the lead-in nose 142 may be urged through an aperture of a third component 253 (see FIG. 14) until the third component 253 is positioned and secured between the knuckles 184, 188 and the lower surface 254 or until the third component 253 is positioned and secured between the knuckles 186, 190 and the lower surface 254. This process may be repeated to fasten a plurality of components between the knuckles 184, 186, 188, 190.

Figure 15:
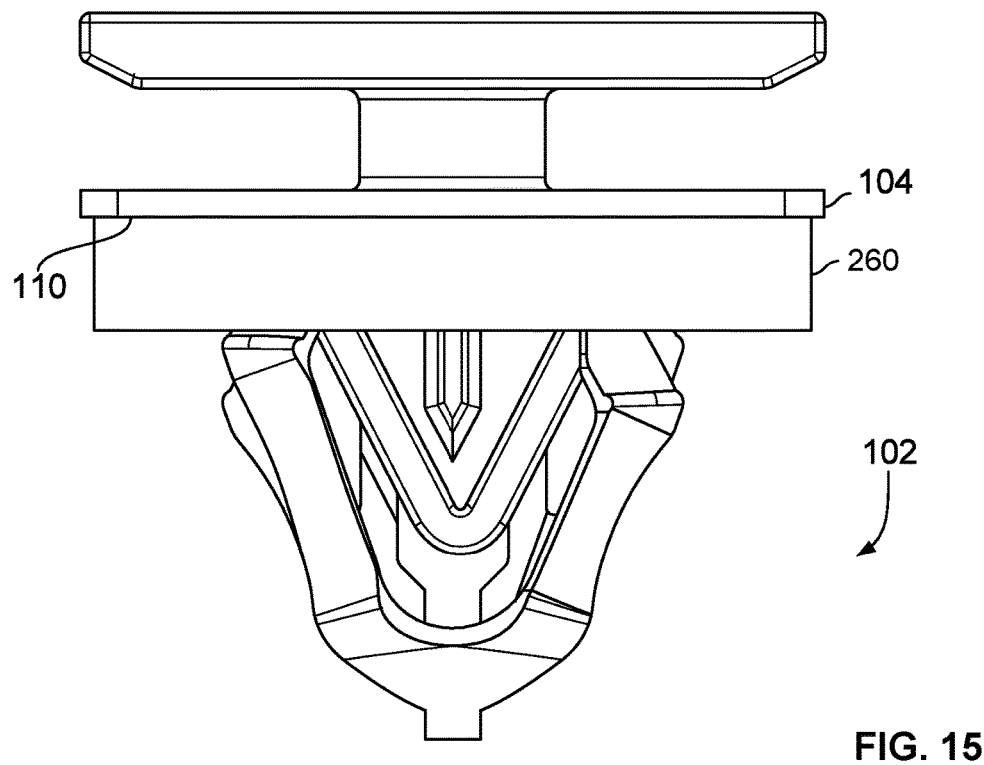
FIG. 15 is a front elevational view of the fastening clip assembly of FIG. 1, wherein the fastening clip assembly further includes a seal.

Turning to FIG. 15, the fastening clip assembly 100 may also include a flexible seal 260 positioned below the collar 104 and coupled to the lower surface 110 thereof. The flexible seal 260 may be a compressible foam washer or a soft, thermoplastic elastomer material. In other embodiments, the flexible seal 260 may be a flexible, umbrella-shaped seal or collar, and may be a substitute for the collar 104. In the embodiment shown in FIG. 15, the flexible seal 260 is configured to compress between the collar 104 and a component retained by the panel-engaging retainer 102, such as the second component 148.

Figure 20:
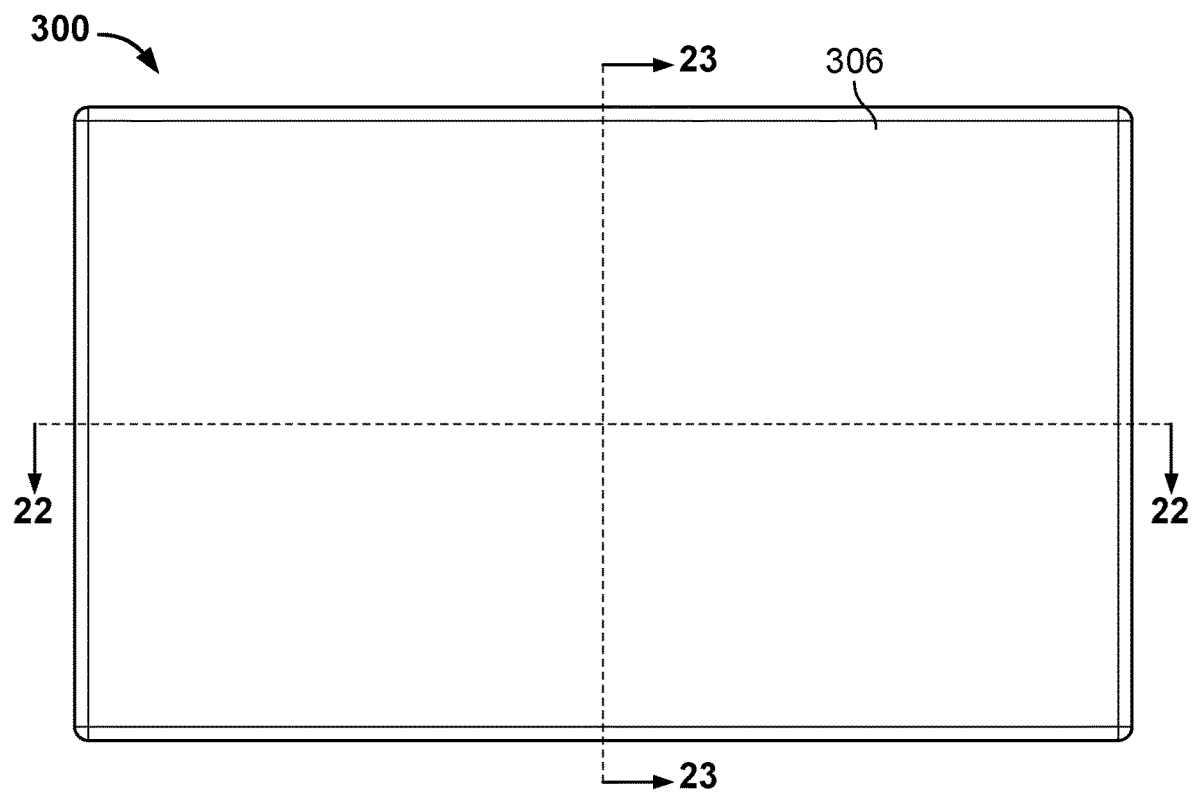
FIG. 20 is a top plan view of the fastening clip assembly of FIG. 16.
Figure 21:
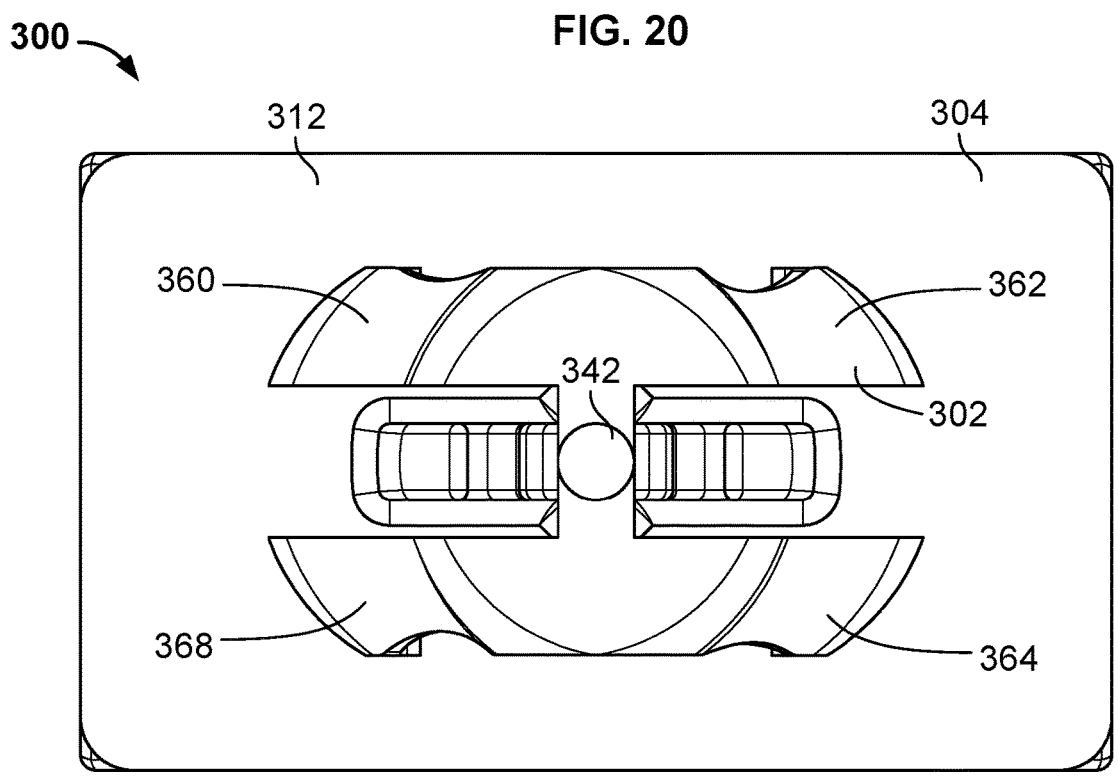
FIG. 21 is a bottom plan view of the fastening clip assembly of FIG. 16.

FIGS. 16-23 depict another fastening clip assembly 300, according to a second aspect of the present disclosure, that includes a panel-engaging retainer 302, a collar 304, a support base 306, and a central post or neck 308. Similar to the fastening clip assembly 100, the fastening clip assembly 300 further includes a distal wall 310 that projects upwardly from a lower surface 312 and extends between the lower surface 312 and an upper surface 314 of the collar 304. The collar 304 and the support base 306 may each, individually, be rectangular, as shown in FIGS. 20 and 21. Further, although the collar 304 and the support base 306 are generally rectangular in this embodiment, the collar 304 and the support base 306 may each, individually, be annular, square, conical, or any other desired shape.

The central post 308 may extend between the collar 304 and the support base 306, may be generally aligned with a longitudinal axis 316, and may provide a spacing 318 into which a first component may be placed and affixed. For example, similar to the fastening clip assembly 100, a first component 320 (see FIGS. 24-26) may be placed between the upper surface 314 of the collar 304 and a lower surface 322 of the support base 306. Further, an aperture 324 of the first component 320 may extend around the central post 308 and, as a result, the support base 306 and the collar 304 may engage and secure the first component 320 therebetween.

The fastening clip assembly 300 may also be integrally molded and may be formed as a single, unitary body. The fastening clip assembly 300 may be integrally molded and formed as a single piece using an injection-molded plastic, for example.

Figure 22:
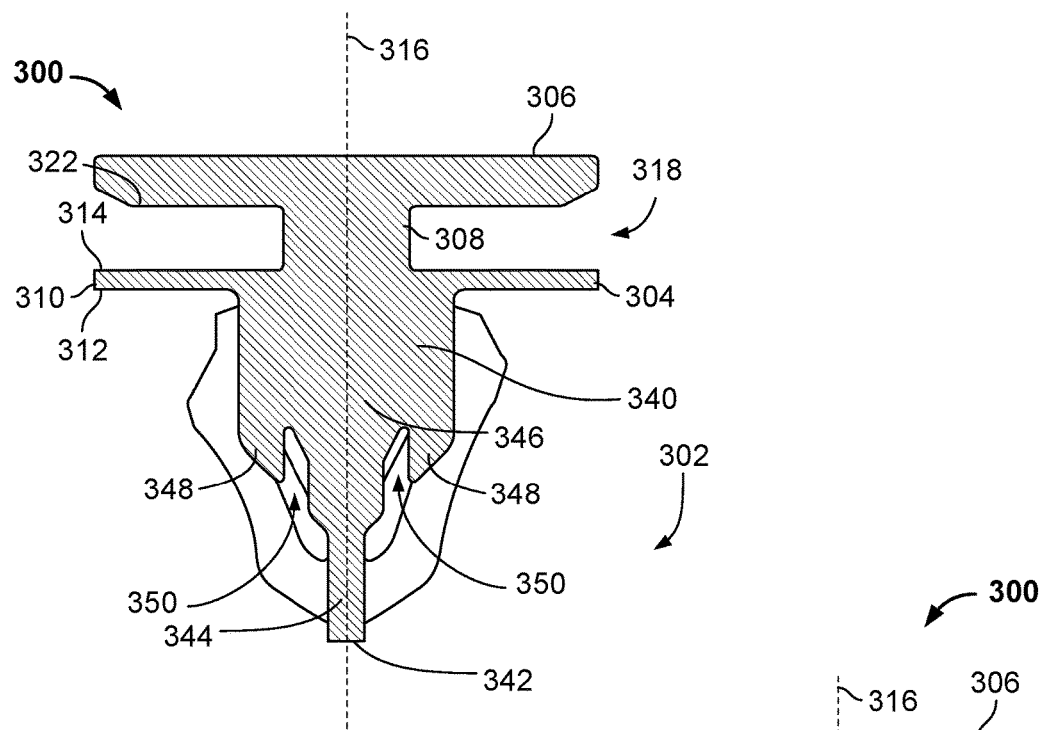
FIG. 22 is a cross-sectional view of the fastening clip assembly of FIG. 16, taken along line 22-22 of FIG. 20.

Turning to FIGS. 17-19 and 22, the fastening clip assembly 300 may further include a central stem 340 that extends downwardly from a center of the lower surface 312 of the collar 304. Further, as best shown in FIG. 22, the central stem 340 extends between the lower surface 312 of the collar 304 and a lead-in nose 342, and connects to the lead-in nose 342 by way of a shaft 344.

Similar to the fastening clip assembly 100, the central stem 340 may also be centered about the longitudinal axis 316, and may include a solid medial section or central beam 346 and two lateral prongs or beams 348. The central stem 340 further includes cut-out sections 350 that may define the two lateral prongs 348. Looking to FIGS. 17 and 18, the central stem 340 may also include a cross brace 352 on a front surface 354 of the central stem 340 and a cross brace 356 on a rear surface 358 of the central stem 340.

The panel-engaging retainer 302 may also include a plurality of wings or retaining legs 360, 362, 364, 366 that extend upward from the beveled lead-in nose 342 and/or outward from an end of the central pedestal or stem 340. In particular, the fastening clip assembly 300 includes a first leg 360, a second leg 362, a third leg 364, and a fourth leg 366. Similar to the fastening clip assembly 100, each leg 360, 362, 364, 366 of the fastening clip assembly 300 may include a flexible root 368, 370, 372, 374, an intermediate extension beam 376, 378, 380, 382, a knuckle 384, 386, 388, 390, a back-angle section 392, 394, 396, 398, and an upwardly extending tab 400, 402, 404, 406.

The knuckles 384, 386, 388, 390 may be defined as a vertex between the extension beams 376, 378, 380, 382 and the back-angled sections 392, 394, 396, 398, and may be further defined by an interior angle. In some instances, the knuckles 384, 386, 388, 390 may be final retention features at a lower end of the back-angled sections 392, 394, 396, 398 that are positioned between the back-angled sections 392, 394, 396, 398 and the lead-in nose 342. However, in some embodiments, the knuckles 384, 386, 388, 390 may not be present altogether. As such, particular reference to the knuckles 384, 386, 388, 390 herein, may also be in reference to the location along the legs 360, 362, 364, 366, respectively, at which point the intermediate extension beams 376, 378, 380, 382 connect or transition to the back-angle sections 392, 394, 396, 398. Alternatively, particular reference to the knuckles 384, 386, 388, 390 herein, may be in reference to the portion of the legs 360, 362, 364, 366 that is farthest from the longitudinal axis 316 or the portion of the legs 360, 362, 364, 366 having the widest width.

Figure 16:
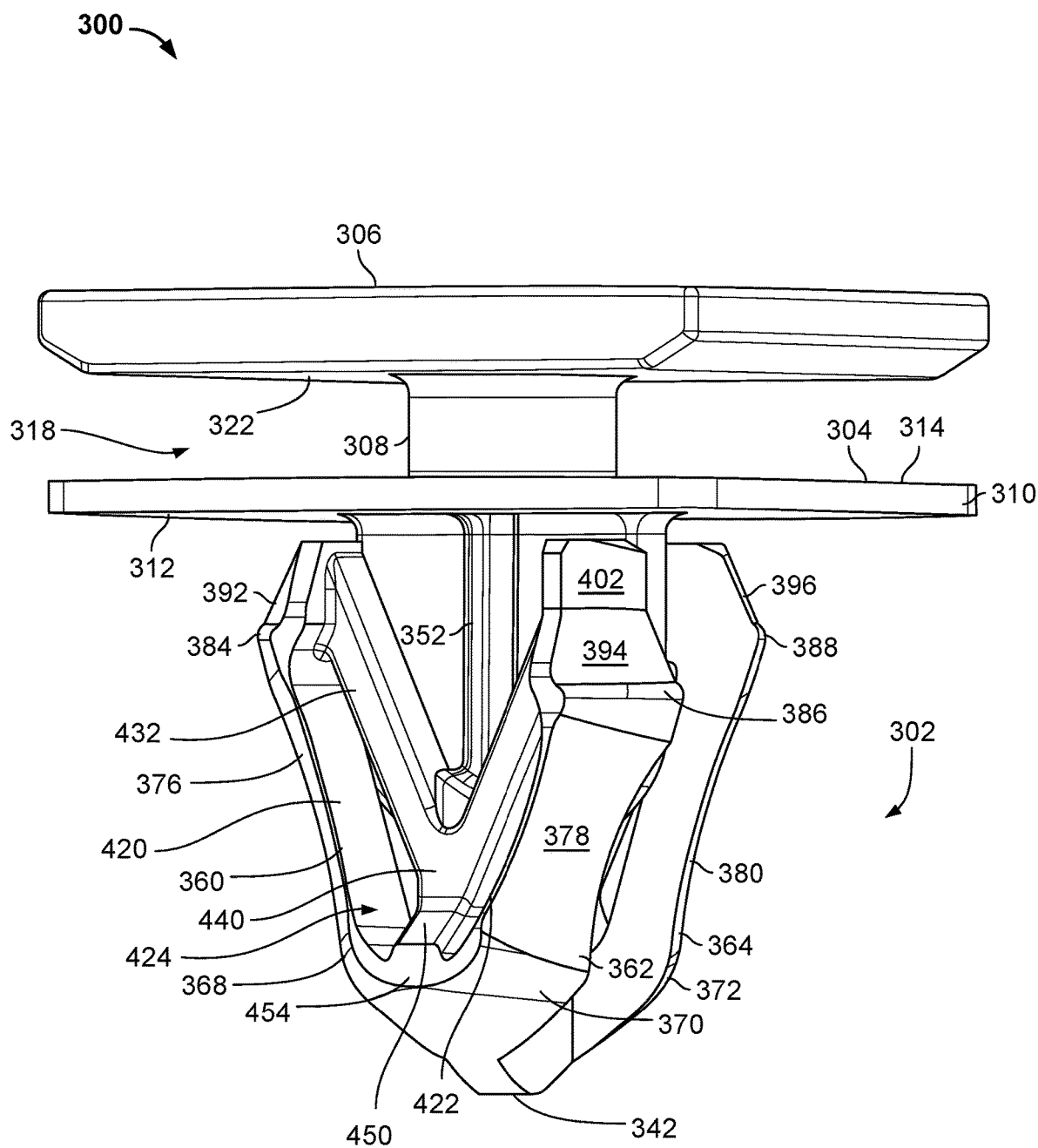
FIG. 16 is a right and front isometric view of a second embodiment of a fastening clip assembly.
Figure 17:
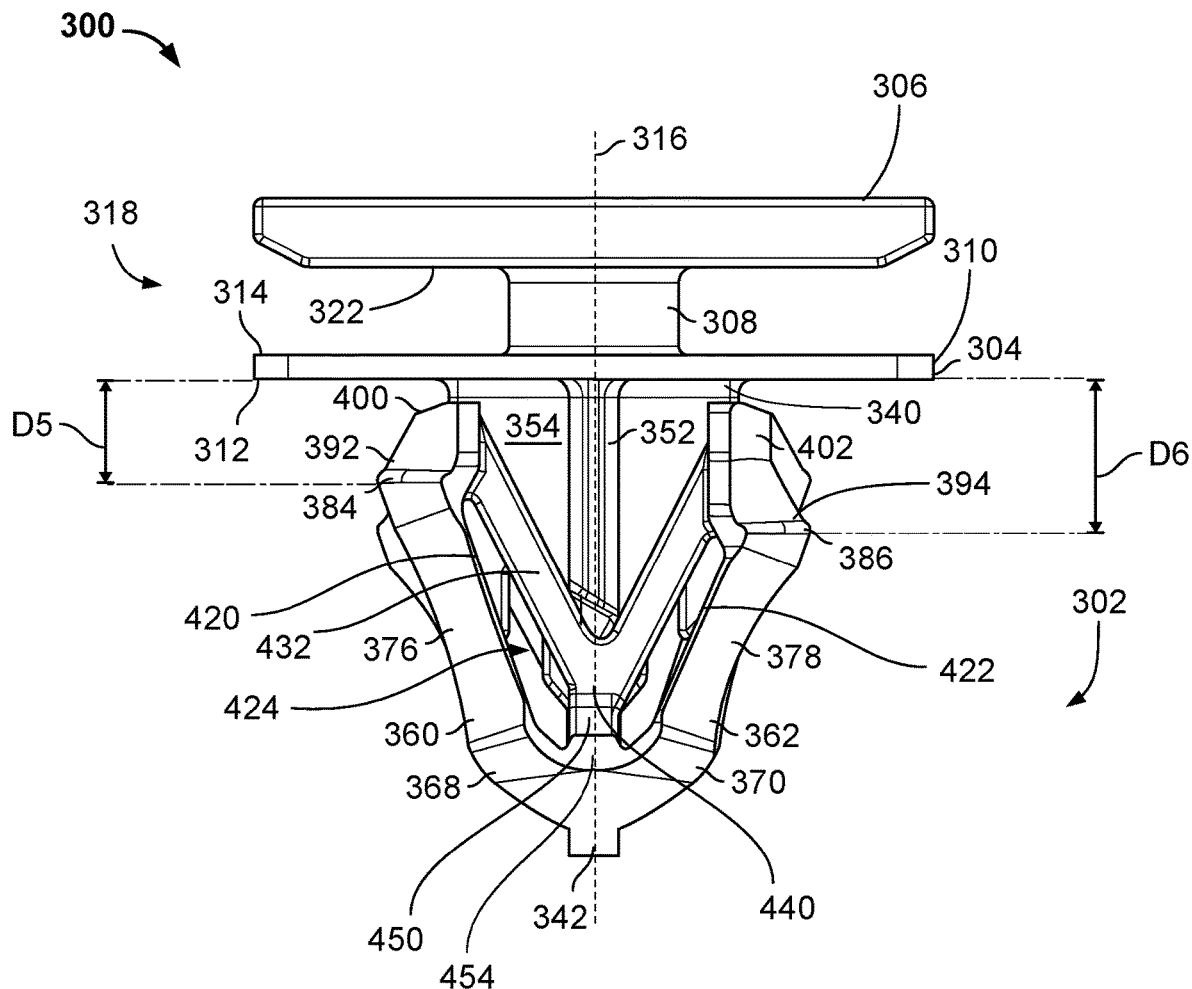
FIG. 17 is a front elevational view of the fastening clip assembly of FIG. 16.
Figure 18:
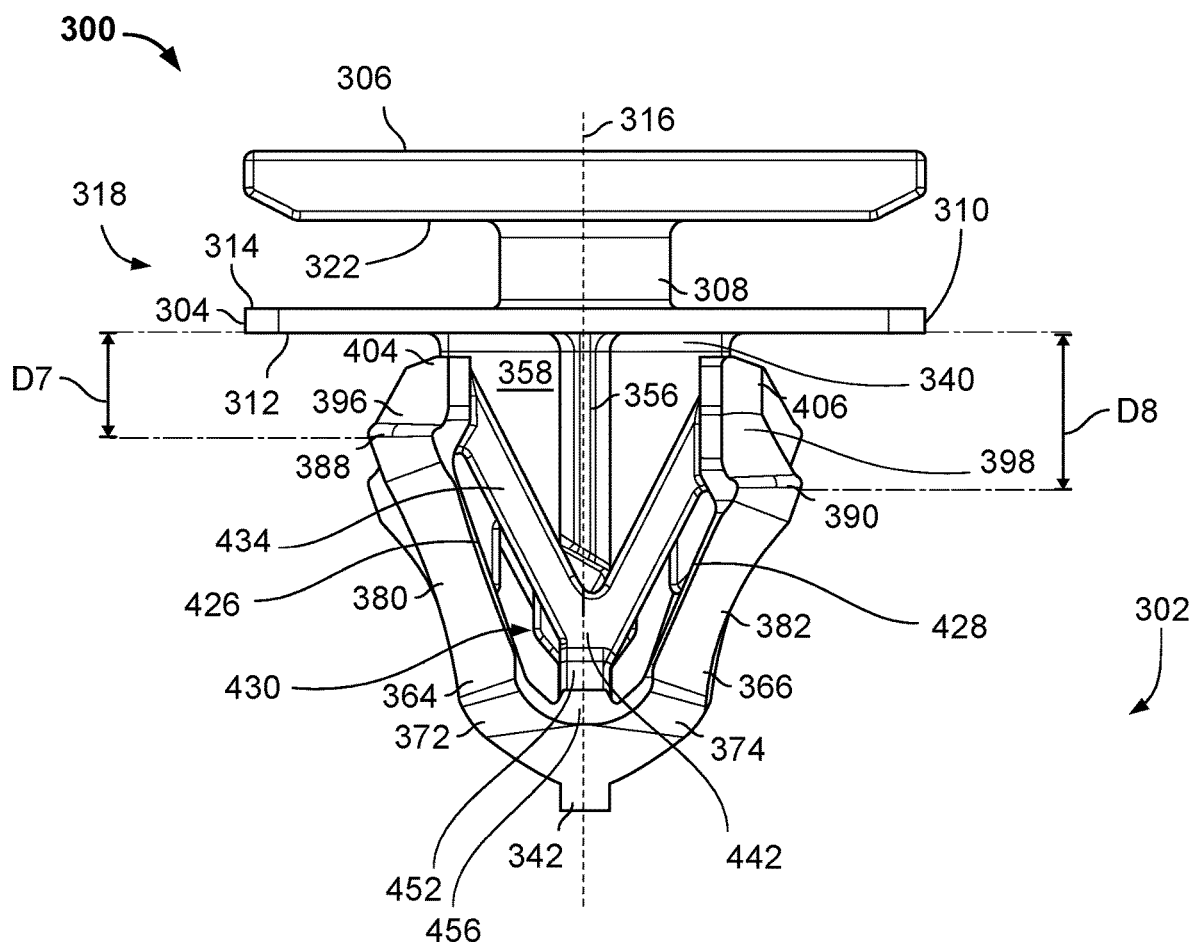
FIG. 18 is a rear elevational view of the fastening clip assembly of FIG. 16.
Figure 19:
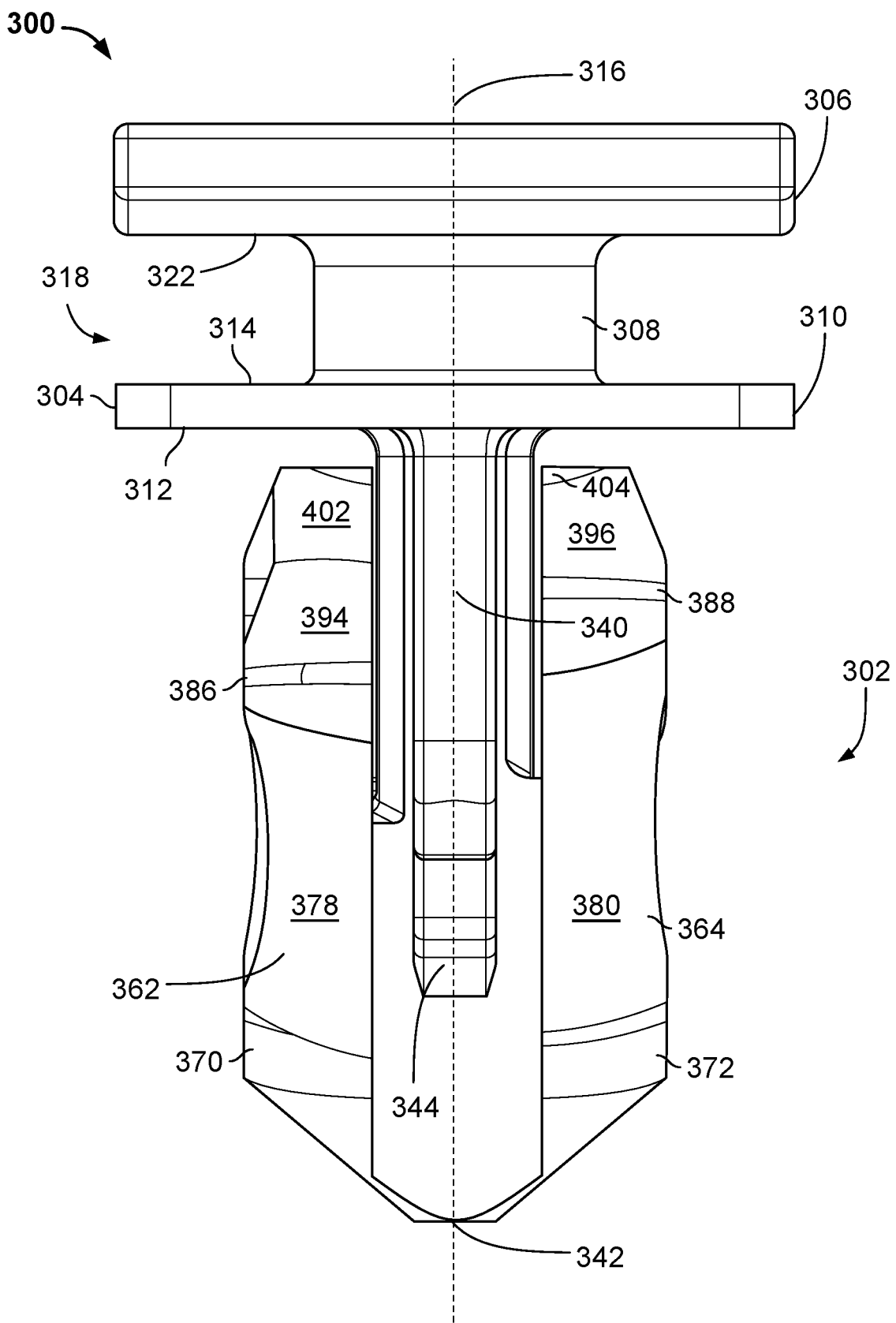
FIG. 19 is a right side elevational view of the fastening clip assembly of FIG. 16.
Figure 23:
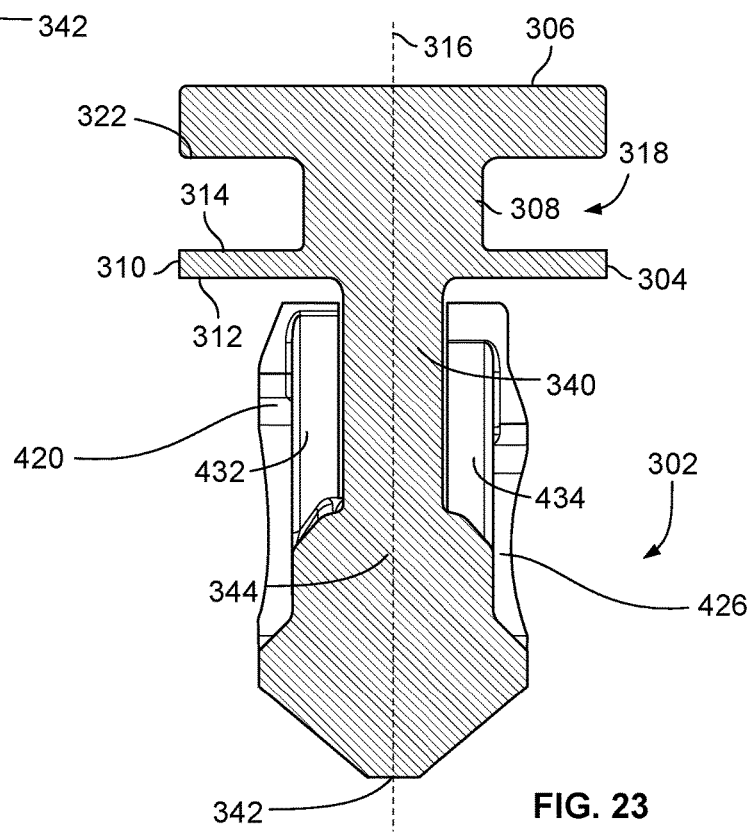
FIG. 23 is a cross-sectional view of the fastening clip assembly of FIG. 16, taken along line 23-23 of FIG. 20.

Referring to FIGS. 16-18, an interior surface 420 of the first leg 360 and an interior surface 422 of the second leg 362 may define a generally parabolic aperture 424 (see FIGS. 16 and 17), and an interior surface 426 of the third leg 364 and an interior surface 428 of the fourth leg 366 may define a generally parabolic aperture 430 (see FIG. 18). A center leg or brace 432 extends or spans between the first leg 360 and the second leg 362, and a center leg or brace 434 extends or spans between the third leg 364 and the fourth leg 366. As best shown in FIGS. 16, 17, and 23, the center leg or brace 432 may extend downward from the interior surface 420 of the first leg 360 and the interior surface 422 of the second leg 362 and, in particular embodiments, the center leg 432 may be V-shaped. And, as best shown in FIGS. 18 and 23, the center leg or brace 434 may extend downward from the interior surface 426 of the third leg 364 and the interior surface 428 of the fourth leg 366 and, in particular embodiments, the center leg 434 may be V-shaped.

In further embodiments, the center leg 432 may extend toward a vertex or distal end 440 positioned between the first leg 360 and the second leg 362, and the center leg 434 may extend toward a vertex distal end 442 positioned between the third leg 364 and the fourth leg 366. The vertex 440 may be located at a central position between the first leg 360 and the second leg 362, and the vertex 442 may be located at a central position between the third leg 364 and the fourth leg 366. The vertex 440 and the vertex 442 may also be generally aligned with the longitudinal axis 316 and may be positioned above the lead-in nose 342. In other embodiments, the vertex 440 and the vertex 442 may be slightly offset relative to the longitudinal axis 316 and may be in closer proximity to the second leg 362 and the fourth leg 366, respectively.

The center leg 432 and the center leg 434 may further include a distal extension 450 and a distal extension 452, respectively. First, with reference to FIG. 17, the distal extension 450 projects from the distal end 440 of the center leg 432 and connects to an interior surface 454 of the panel-engaging retainer 302 that is between the first leg 360 and the second leg 362. Similarly, with reference to FIG. 18, the distal extension 452 projects from the distal end 442 of the center leg 434 and connects to an interior surface 456 of the panel-engaging retainer 302 that is between the third leg 364 and the fourth leg 366. The center leg or brace 432 and the center leg or brace 434 also each individually connect to the central stem 340 (see FIG. 23). As a result, the legs 360, 362, 364, 366 may be connected to the central stem 340 at the lead-in nose 342 and further connected to the central stem 340 through the center legs 432, 434. The center leg 432, the center leg 434, and the central stem 340 each function to support the first leg 360, the second leg 362, the third leg 364, and the fourth leg 366 by distributing load therebetween.

Further, using this configuration, each leg 360, 362, 364, 366 may include a respective brace therefor. In particular, with reference to FIGS. 17 and 18, the portion of the center leg 432 extending between the first leg 360 and the vertex 440 may be an individual brace for the first leg 360, the portion of the center leg 432 extending between the second leg 362 and the vertex 440 may be an individual brace for the second leg 362, the portion of the center leg 434 extending between the third leg 364 and the vertex 442 may be an individual brace for the third leg 364, and the portion of the center leg 436 extending between the fourth leg 366 and the vertex 442 may be an individual brace for the fourth leg 366.

The retaining legs 360, 362, 364, 366 may also be regularly spaced about or around the central stem 340. Further, similar to the fastening clip assembly 100, the knuckle 384 of the first leg 360 and the knuckle 386 of the second leg 362 may be offset relative to one another, and the knuckle 388 and the knuckle 390 may be offset relative to one another. More particularly, the knuckles 384, 386, 388, 390 of the fastening clip assembly 300 may be generally spaced from a lower surface 312 of the collar 304. And, in this particular embodiment, the knuckle 384 of the first leg 360 may be spaced a distance D5 from the lower surface 312 of the collar 304, and the knuckle 386 of the second leg 362 may be spaced a distance D6 from the lower surface 312 of the collar 304. Further, the knuckle 388 of the third leg 364 may be spaced a distance D7 from the lower surface 312 of the collar 304, and the knuckle 390 of the fourth leg 366 may be spaced a distance D8 from the lower surface 312 of the collar 304.

Further, as previously discussed herein, the knuckles 384, 386, 388, 390 may not be present in some embodiments and, in such embodiments, the distances D5, D6, D7, D8 may be measured from the lower surface 312 of the collar 304 to a lower end of the back-angled sections 392, 394, 396, 398, respectively.

In one particular embodiment, as shown in FIGS. 17 and 18, the distance D5 is less than the distance D6 and, specifically, the distance D5 may be approximately half to ⅔rds the distance D6. Further, in this particular embodiment, the distance D7 is less than the distance D8 and, specifically, the distance D7 may be approximately half to ⅔rds the distance D8. Even further, in this embodiment, the distance D5 may be equal to the distance D7 and the distance D6 may be equal to the distance D8. In other embodiments, the distance D5 and the distance D7 may be approximately ¼th, or approximately ⅓rd, or approximately ⅔rds, or approximately ¾ths of the distance D6 and/or the distance D8. In further embodiments, as will be appreciated by those skilled in the art, the distance D5 and distance D7 may be a predetermined distance large enough to accommodate and secure a component having a first thickness. In particular, the fastener clip assembly 300 may accommodate a component between the knuckles 384, 388 and the lower surface 312 of the collar 304, such that the component engages the back-angled sections 392, 396 and/or the knuckles 384, 388. Additionally, the distance D6 and D8 may be a predetermined distance large enough to accommodate and secure a component having a second thickness, which may be larger than the distance D1 and/or the distance D3. In this embodiment, the fastener clip assembly 300 may accommodate the component having the second thickness between the knuckles 386, 390 and the lower surface 312 of the collar 304, such that the component engages the back-angled sections 394, 398 and/or the knuckles 386, 390.

In other embodiments, as will be further discussed herein, the distance D6 and the distance D8 may be a predetermined distance large enough to accommodate and secure a plurality of components having a combined thickness, all of which may be secured by the fastening clip assembly 300. For example, a first component may be secured by the back-angled sections 392, 396 and/or the knuckles 384, 388, and may have a relative thickness equal or less than the distances D5 and/or D7, and a second component may be secured between the knuckles 386, 390 and a lower surface of the first component secured by the back-angled sections 392, 396 and/or the knuckles 384, 388. In such embodiments, the distances D6 and D8 may be relatively equal to or greater than the combined thicknesses of all of the components secured between the knuckles 386, 390 and the lower surface 312.

In further embodiments, the distances D5, D6, D7, D8 may each, individually, be spaced a predetermined distance from the lower surface 312 of the collar 304. For example, in one embodiment, the distances D5, D6, D7, D8 may be equal. In an alternative embodiment, the distance D5 may be different than the distances D6, D7, D8, all of which may be equal. In another embodiment, as previously discussed herein, the distance D5 and the distance D7 may be equal, the distance D6 and the distance D8 may be equal, and the distances D5, D7 may be different than the distances D6, D8. Alternatively, the distance D5 and the distance D6 may be equal, the distance D7 and the distance D8 may be equal, and the distances D5, D6 may be different than the distances D7, D8. Further, the distances D5 and the distance D8 may be equal, the distance D6 and the distance D7 may be equal, and the distances D5, D8 may be different than the distances D6, D7. In yet another embodiment, two of the distances D5, D6, D7, D8 may be equal, while the other two distances may be different. Still further, the distances D5, D6, D7, D8 may all be different from one another.

As previously discussed herein, the inclusion of legs having knuckles located at various heights along the legs and/or the inclusion of legs having back-angles and/or tabs located at varying heights increases the range of components the fastening clip assembly 300 may secure. Further, the inclusion of legs having knuckles located at various heights along the legs and/or the inclusion of legs having back-angles located at varying heights may increase the setup height variation of the fastener clip assembly 300.

FIGS. 24-29 illustrate a method of using the fastening clip assembly 300 and, in particular, a process in which the fastening clip assembly 300 fastens or secures a first component 320, e.g., a first panel, together with a second component 460, e.g., a second panel, and optionally, a third component 461 (see FIG. 29), e.g., a third panel.

Figure 24:
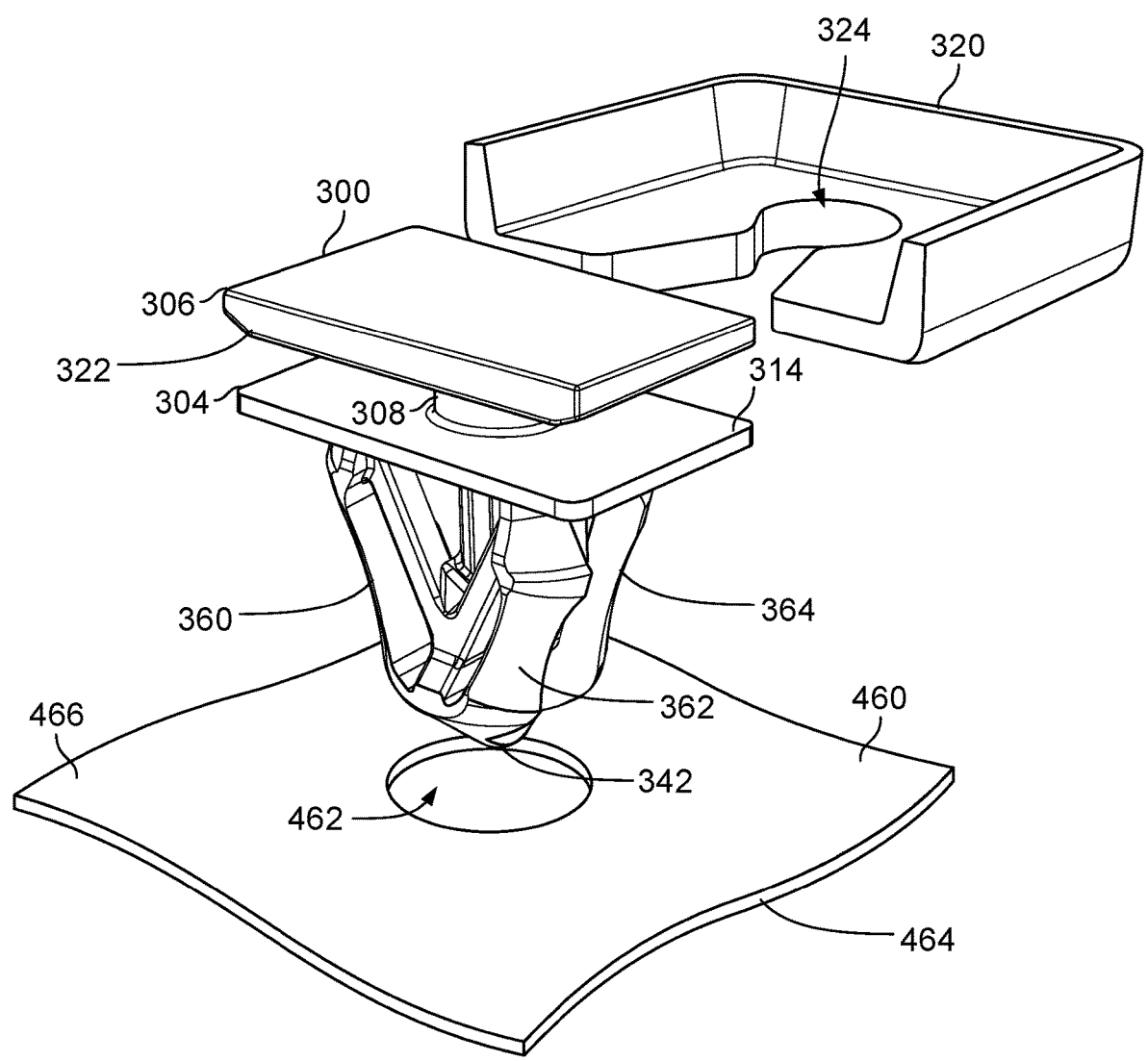
FIG. 24 is the fastening clip assembly of FIG. 16 aligned with an aperture of a first and second component.

First, as shown in FIG. 24, a user may align the fastening clip assembly 300 with one or more holes or apertures, e.g., the aperture 324 of the first component 320 and an aperture 462 of the second component 460. Then, a user may push the first component 320 toward the central stem 308 so that the first component 320 snaps in engagement with the fastening clip assembly 300 (see FIG. 25). Once engaged, the central stem 308 of the fastening clip assembly 300 may extend through the aperture 324 of the first component 320, and the first component 320 may be positioned and secured between the collar 304 and the support base 306.

Figure 25:
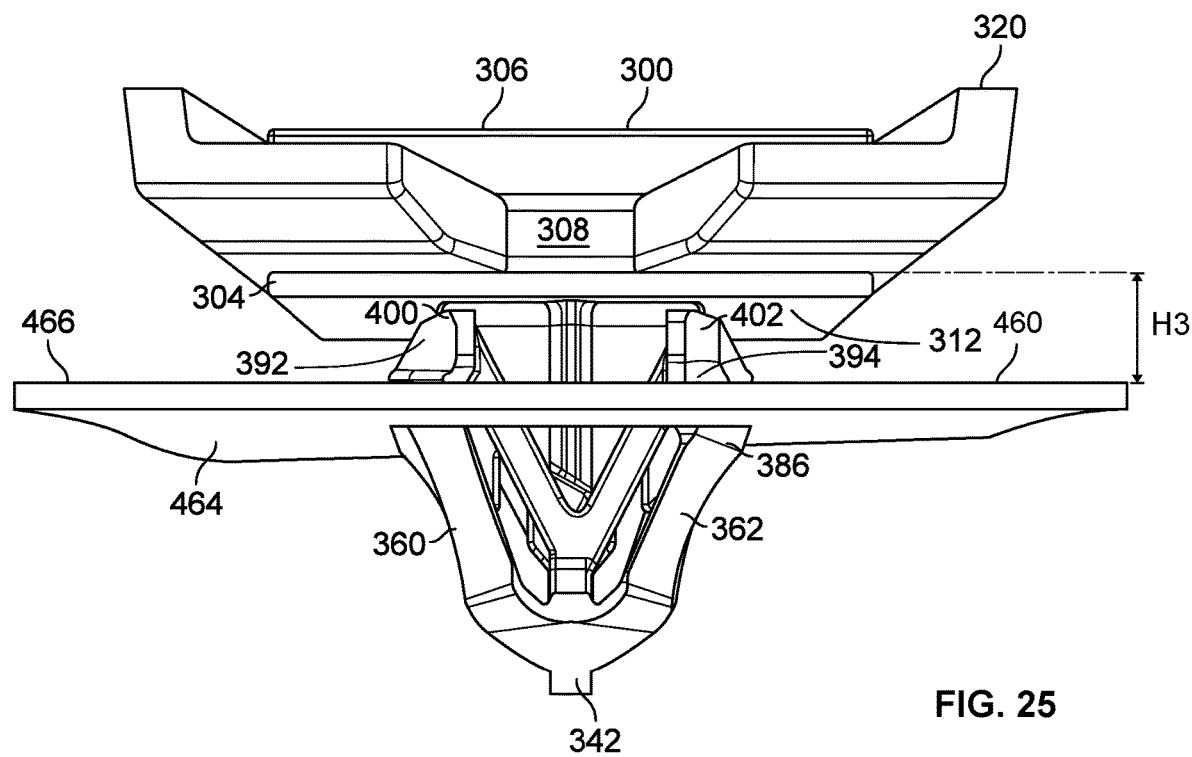
FIG. 25 depicts the fastening clip assembly of FIG. 24 showing the first and second components at their maximum potential setup height.
Figure 26:
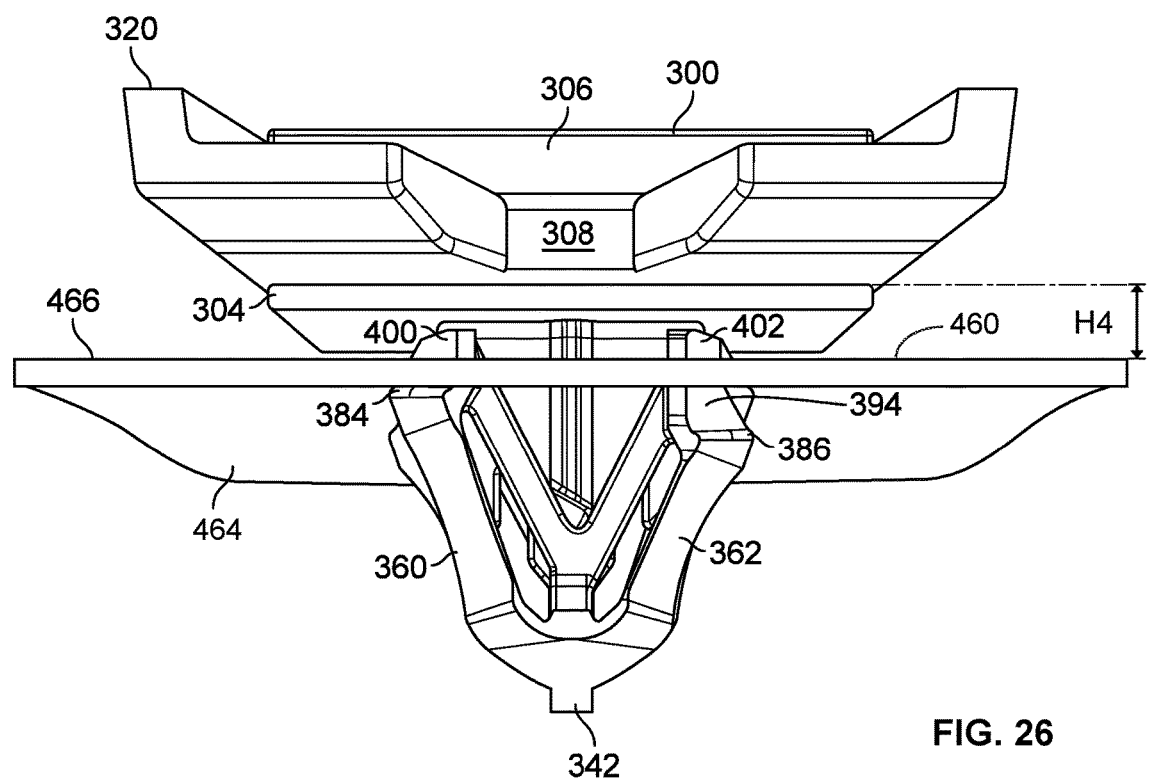
FIG. 26 depicts the fastening clip assembly of FIG. 24 showing the first and second components at an intermediate potential setup height.

Next, the lead-in nose 342 of the fastening clip assembly 300 may be urged into and through the aperture 462 of the second component 460 until the second component 460 is positioned between the knuckles 386, 390 and the lower surface 312 of the collar 304 (see FIG. 25), or until the second component 460 is positioned between the knuckles 384, 388 and the lower surface 312 of the collar 304 (see FIG. 26). As previously discussed, the second component 460 may have a variety of thicknesses, and depending on the thickness of the second component 460, either the legs 360, 364 or the legs 362, 366 may engage a lower surface 464 of the second component 460. Alternatively, as also previously discussed herein, multiple setup heights between the first component 320 and the second component 460 may be desired. And depending on the desired setup height, either the legs 360, 364 or the legs 362, 368 may engage the lower surface 464 of the second component 460.

The legs 360, 362, 364, 366 (as well as the first brace 432 and the second brace 434) may flex or compress inwardly toward the longitudinal axis 316 as the fastening clip assembly 300 is urged through the second aperture 462 of the second component 460. The fastening clip assembly 300 may be continuously urged through the second aperture 462 of the second component 460 until the knuckles 384, 388 and/or the knuckles 386, 390 pass through the second aperture 462, as shown in FIGS. 25 and 26. In particular embodiments, the lower surface 312 of the collar 304 may also abut against an upper surface 466 of the second component 460, which surrounds the second aperture 462.

Figure 27:
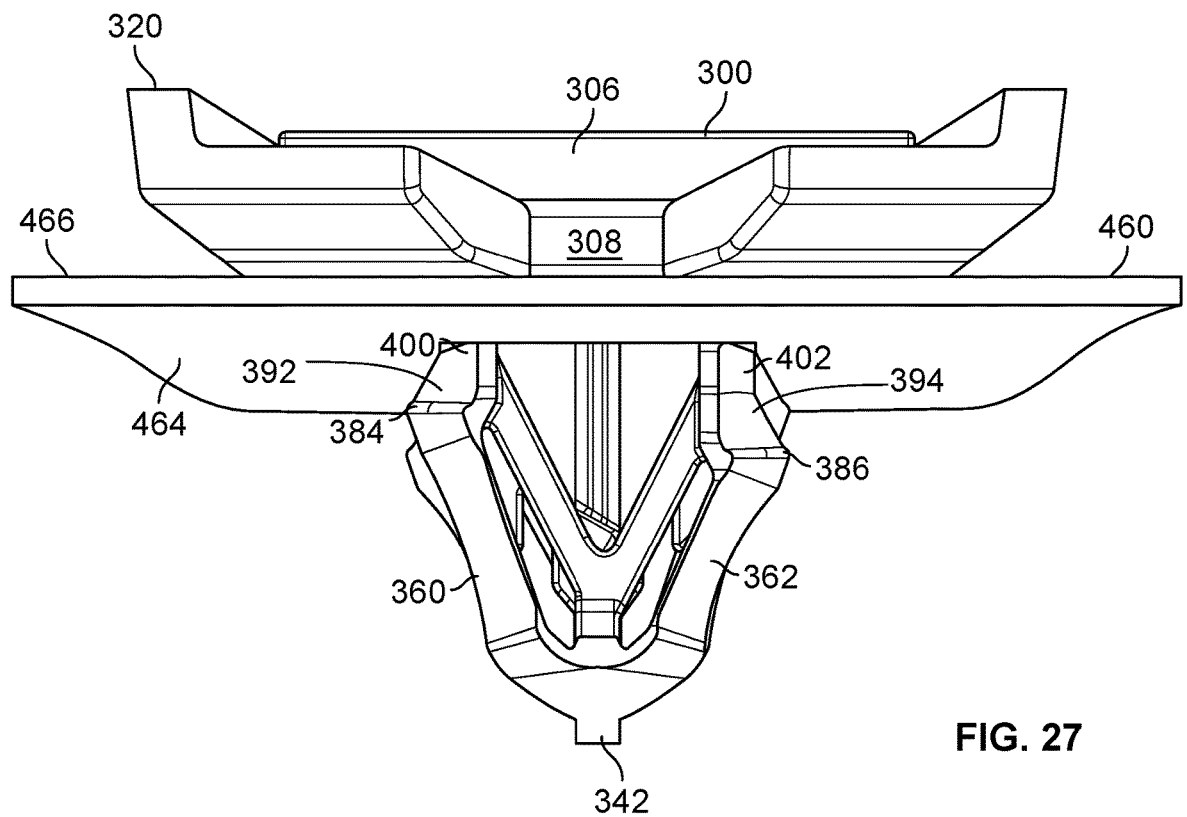
FIG. 27 depicts the fastening clip assembly of FIG. 24 showing the first and second components at their minimum potential setup height.
Figure 28:
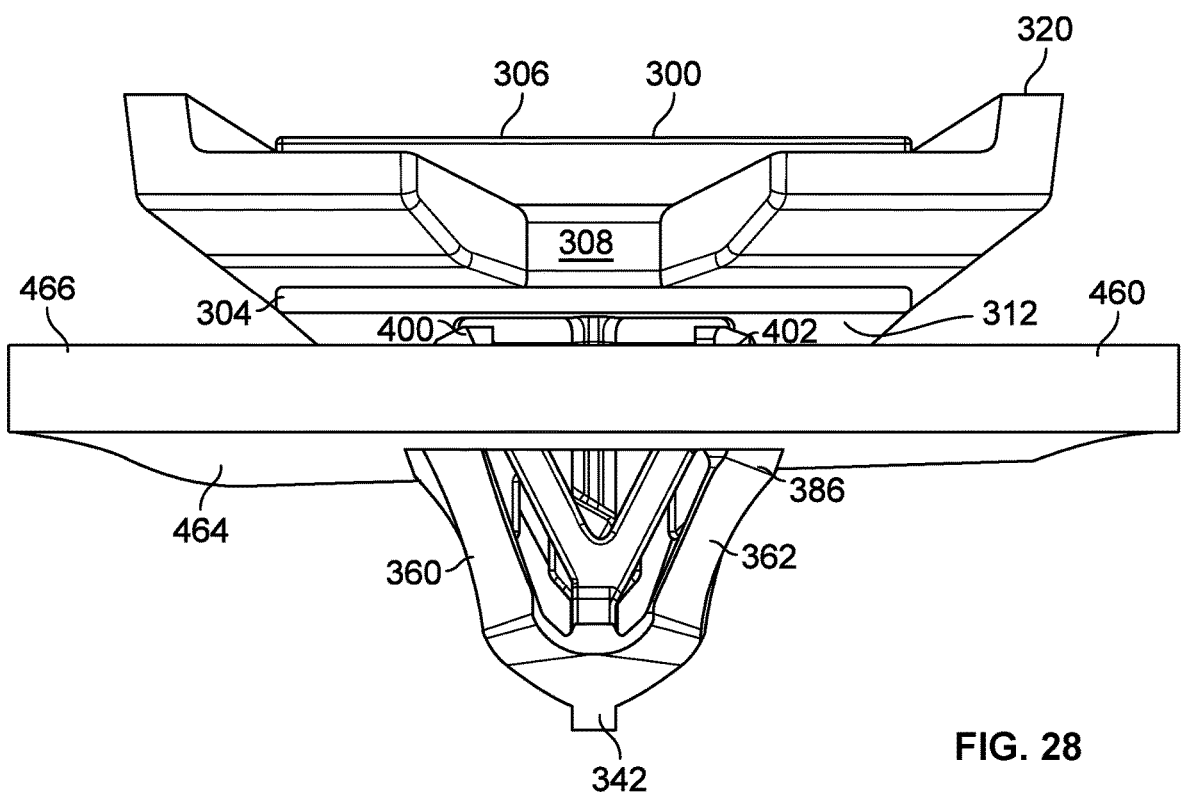
FIG. 28 depicts the fastening clip assembly of FIG. 16 mated with a first and second component.
Figure 29:
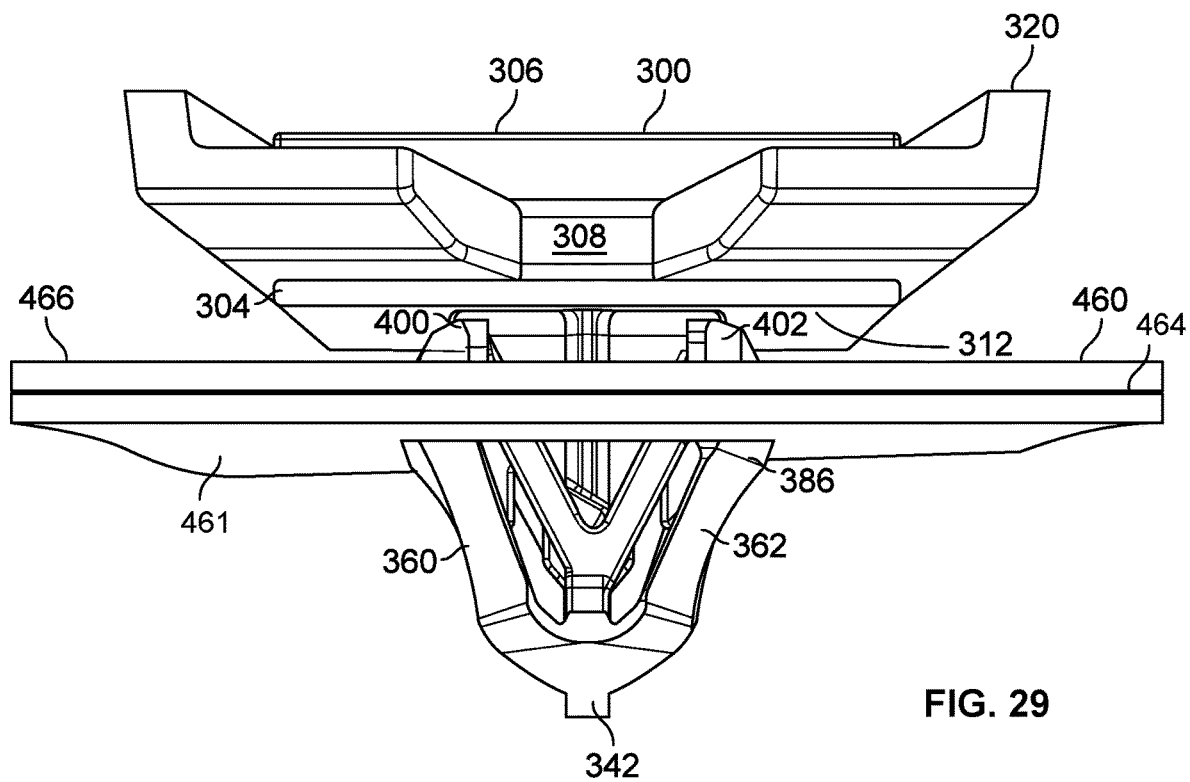
FIG. 29 depicts the fastening clip assembly of FIG. 16 mated with a first component, a second component, and a third component.

The inclusion of legs having knuckles located at various heights along the legs may allow the fastener clip assembly 300 to accommodate a component having varying thickness, as shown in FIGS. 25 and 28, for example. Further, the inclusion of legs having knuckles located at various heights along the legs and/or back-angled sections located at various heights along the legs may increase the setup height variation of the fastener clip assembly 300. For example, as shown in FIGS. 25-27, the fastener clip assembly 300 may have a first setup height H3 (see FIG. 25), a second setup height H4 (see FIG. 26), and a third setup height (see FIG. 27). In this embodiment, the first setup height H3 is the maximum potential setup height, the second setup height H4 is an intermediate setup height, and the third setup height (not shown) is the minimum setup height, which may be relatively equal to a thickness of the collar 304.

In other embodiments, after the second component 460 is positioned between the knuckles 386, 390 (as shown in FIGS. 25 and 26), the lead-in nose 342 may be urged through an aperture of a third component 461 (see FIG. 29) until the third component 461 is positioned and secured between the knuckles 386, 390 and the lower surface 464 or until the third component 461 is positioned and secured between the knuckles 386, 390 and the lower surface 464. This process may be repeated to fasten a plurality of components between the knuckles 384, 386, 388, 390.

Figure 30:
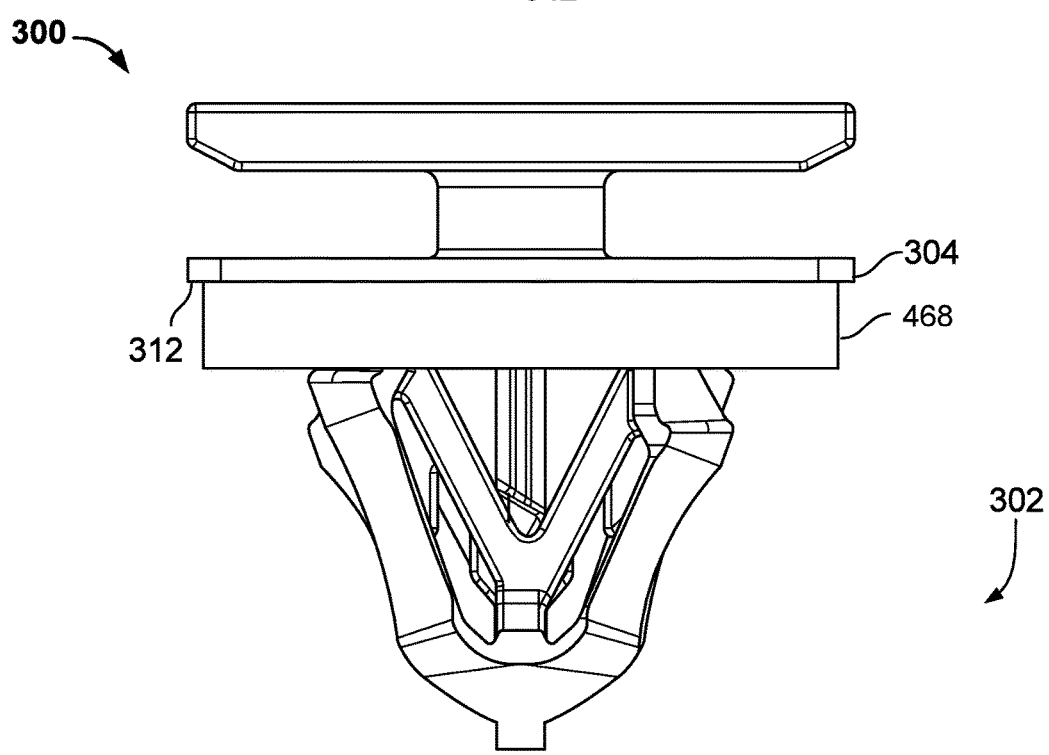
FIG. 30 is a front elevational view of the fastening clip assembly of FIG. 16, wherein the fastening clip assembly further includes a seal.

Turning to FIG. 30, the fastening clip assembly 300 may also include a flexible seal 468 positioned below the collar 304 and coupled to the lower surface 312 thereof. The flexible seal 468 may be a compressible foam washer or a soft, thermoplastic elastomer material. In other embodiments, the flexible seal 468 may be a flexible, umbrella-shaped seal or collar, and may be a substitute for the collar 304. In the embodiment depicted in FIG. 30, the flexible seal 468 may be configured to compress between the collar 304 and a component retained by the panel-engaging retainer 302, such as the second component 460.

The term "about," as used herein, refers to variation in the numerical quantity that may occur, for example, through typical measuring and manufacturing procedures for embodiments of the disclosure herein. Throughout the disclosure, the terms "about" refer to a range of values ±5% of the numeric value that the term precedes.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

While various spatial and directional terms, such as top, bottom, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

I claim:

1. A fastening clip assembly configured to secure to one or more components, the fastening clip assembly comprising:

a collar having a lower surface;

a stem extending from the lower surface of the collar to a lead-in nose;

a first leg having a first knuckle; and a second leg having a second knuckle, wherein the first leg and the second leg define an aperture and wherein a brace spans across the aperture, wherein the first and second leg extend from the lead-in nose, wherein the first knuckle is located a first distance from the lower surface of the collar and the second knuckle is located a second distance from the lower surface of the collar, and wherein the first distance is different than the second distance.

2. The fastening clip assembly of claim 1, wherein the fastening clip assembly further includes a third leg having a third knuckle and a fourth leg having a fourth knuckle.

3. The fastening clip assembly of claim 2, wherein the third knuckle is located a third distance from the lower surface of the collar and the fourth knuckle is located a fourth distance from the lower surface of the collar, and wherein the third distance is different than the fourth distance.

4. The fastening clip assembly of claim 3, wherein the first distance is equal to the third distance and the second distance is equal to the fourth distance.

5. The fastening clip assembly of claim 4, wherein the first leg includes a first intermediate beam extending between the lead-in nose and the first knuckle, the second leg includes a second intermediate beam extending between the lead-in nose and the second knuckle, the third leg includes a third intermediate beam extending between the lead-in nose and the third knuckle, and the fourth leg includes a fourth intermediate beam extending between the lead-in nose and the fourth knuckle.

6. The fastening clip assembly of claim 5, wherein the first leg further includes a first back-angle section, the second leg further includes a second back-angle section, the third leg further includes a third back-angle section, and the fourth leg further includes a fourth back-angle section.

7. The fastening clip assembly of claim 6, wherein the fastening clip assembly further includes the brace between the first leg and the second leg, and a brace between the third leg and the fourth leg.

8. The fastening clip assembly of claim 1, wherein the fastening clip assembly further comprises a support base and a post that extends between the collar and the support base.

9. The fastening clip assembly of claim 8, wherein the fastening clip assembly is configured to secure a first component between the collar and the support base, and configured to secure a second component between the first and second legs and the lower surface of the collar.

10. The fastening clip assembly of claim 9, wherein the fastening clip assembly is configured to secure the second component between the first knuckle and the lower surface of the collar.

11. The fastening clip assembly of claim 9, wherein the fastening clip assembly is configured to secure the second component between the second knuckle and the lower surface of the collar.

12. A fastening clip assembly configured to secure to one or more components, the fastening clip assembly comprising:

a collar; and a panel-engaging retainer including a lead-in nose, a first leg having a first beam extending from the lead-in nose and to a first back-angle section, a second leg having a second beam extending from the lead-in nose and to a second back-angle section, and a first brace extending between the first leg and the second leg, wherein the brace extends from the first back-angle section and wherein the brace extends from the second back-angle section, and wherein the panel-engaging retainer is connected to the collar, and wherein the first beam is longer than the second beam.

13. The fastening clip assembly of claim 12, wherein the panel-engaging retainer further includes a third leg having a third beam that extends from the lead-in nose and to a third back-angle section, and a fourth leg having a fourth beam extending from the lead-in nose and to a fourth back-angle section.

14. The fastening clip assembly of claim 13, wherein the first leg includes a first knuckle between the first beam and the first back-angle section, the second leg includes a second knuckle between the second beam and the second back-angle section, the third leg includes a third knuckle between the third beam and the third back-angle section, and the fourth leg includes a fourth knuckle between the fourth beam and the fourth back-angle section.

15. The fastening clip assembly of claim 14, wherein the third beam is longer than the fourth beam.

16. The fastening clip assembly of claim 15, wherein the panel-engaging retainer further includes a stem that extends between the collar and the lead-in nose.

17. The fastening clip assembly of claim 16, wherein the first brace extends between the first leg and the second leg, and a second brace extends between the third leg and the fourth leg.

18. The fastening clip assembly of claim 14, wherein the fastening clip assembly further includes a head and a post extending between the head and the collar.

19. The fastening clip assembly of claim 18, wherein the fastening clip assembly is configured to secure a first component between the head and the collar, and configured to secure a second component between at least the second knuckle and the collar.

20. A fastening clip assembly configured to secure one or more components, the fastening clip assembly comprising:
   a head;
   a collar having an upper surface and a lower surface; and
   a panel-engaging retainer including:
      a stem extending from the lower surface of the collar to a lead-in nose;
      a first leg having an outwardly-canting beam, an inwardly-canting beam, and a knuckle therebetween;
      a second leg having an outwardly-canting beam, an inwardly-canting beam, and a knuckle therebetween;
      a third leg having an outwardly-canting beam, an inwardly-canting beam, and a knuckle therebetween;
      a fourth leg having an outwardly-canting beam, an inwardly-canting beam, and a knuckle therebetween; and
      a first V-shaped brace extending between the first leg and the second leg, and a second V-shaped brace extending between the third leg and the fourth leg,
   wherein the knuckle of the first leg and the knuckle of the third leg are located a first distance from the lower surface of the collar, and the knuckle of the second leg and the knuckle of the fourth leg are located a second distance from the lower surface of the collar,
   wherein the first distance is different than the second distance, and
   wherein the first leg and the third leg are cater-corner relative to one another, and the second leg and the fourth leg are cater-corner relative to one another.

* * * * *